US012709469B2

(12) United States Patent
Rocholl et al.

(10) Patent No.: US 12,709,469 B2
(45) **Date of Patent: *Aug. 18, 2026**

(54) FRONT LIFT ASSEMBLY FOR ELECTRIC REFUSE VEHICLE

(71) Applicant: Oshkosh Corporation, Oshkosh, WI (US)

(72) Inventors: Joshua D. Rocholl, Rochester, MN (US); Derek A. Wente, Austin, MN (US); John T. Kellander, Oronoco, MN (US); Cody D. Clifton, Oshkosh, WI (US); Vincent Hoover, Byron, MN (US); Zachary L. Klein, Rochester, MN (US); Clinton T. Weckwerth, Pine Island, MN (US); Skylar A. Wachter, Dodge Center, MN (US); Andrew Kotloski, Oshkosh, WI (US); Wallace Buege, West Bend, WI (US); Caleb Binder, Oshkosh, WI (US); Martin J. Schimke, Redgranite, WI (US)

(73) Assignee: Oshkosh Corporation, Oshkosh, WI (US)

( * ) Notice: Subject to any disclaimer, the term of this patent is extended or adjusted under 35 U.S.C. 154(b) by 134 days.

This patent is subject to a terminal disclaimer.

(21) Appl. No.: 18/603,358

(22) Filed: Mar. 13, 2024

(65) Prior Publication Data

US 2024/0217735 A1 Jul. 4, 2024

Related U.S. Application Data

(63) Continuation of application No. 18/196,334, filed on May 11, 2023, now Pat. No. 11,964,818, which is a (Continued)

(51) Int. Cl.

*B65F 3/04* (2006.01)
*B65F 3/06* (2006.01)
*B65F 3/02* (2006.01)

(52) U.S. Cl.

CPC ................ *B65F 3/041* (2013.01); *B65F 3/06* (2013.01); *B65F 2003/025* (2013.01); *B65F 2003/0279* (2013.01)

(58) Field of Classification Search

CPC ..... B65F 3/041; B65F 3/06; B65F 2003/0279
See application file for complete search history.

(56) References Cited

U.S. PATENT DOCUMENTS 5,658,117 A 8/1997 Mckinney et al.
5,720,589 A 2/1998 Christenson et al.

(Continued)

*Primary Examiner* — Jonathan Snelting
(74) *Attorney, Agent, or Firm* — Foley & Lardner LLP

(57) ABSTRACT

A refuse vehicle includes a chassis, a body assembly coupled to the chassis where the body assembly defines a refuse compartment, and a lift assembly. The lift assembly includes a first lift arm, a second lift arm, a pair of forks, and a lift arm actuator assembly. The lift arm actuator assembly includes a first electric lift actuator positioned proximate the first lift arm, a second electric lift actuator positioned proximate the second lift arm where the first electric lift actuator and the second electric lift actuator are configured to pivot the first lift arm and the second lift arm, and one or more electric fork actuators configured to pivot the pair of forks relative to the first lift arm and the second lift arm.

20 Claims, 23 Drawing Sheets

Related U.S. Application Data continuation of application No. 17/674,652, filed on Feb. 17, 2022, now Pat. No. 11,685,599, which is a continuation of application No. 16/851,844, filed on Apr. 17, 2020, now Pat. No. 11,254,499.

(60) Provisional application No. 62/843,052, filed on May 3, 2019.

(56) References Cited

U.S. PATENT DOCUMENTS

| | | | |
|---|---|---|---|
| 5,833,428 | A | 11/1998 | Szinte |
| 5,919,026 | A | 7/1999 | Appleton |
| 5,919,027 | A | 7/1999 | Christenson |
| 5,934,858 | A | 8/1999 | Christenson |
| 5,934,867 | A | 8/1999 | Christenson |
| 5,938,394 | A | 8/1999 | Christenson |
| 5,951,235 | A | 9/1999 | Young et al. |
| 5,967,731 | A | 10/1999 | Brandt |
| 5,971,694 | A | 10/1999 | Mcneilus et al. |
| 5,984,609 | A | 11/1999 | Bartlett |
| 6,033,176 | A | 3/2000 | Bartlett |
| 6,062,803 | A | 5/2000 | Christenson |
| 6,089,813 | A | 7/2000 | Mcneilus et al. |
| 6,120,235 | A | 9/2000 | Humphries et al. |
| 6,123,500 | A | 9/2000 | Mcneilus et al. |
| 6,210,094 | B1 | 4/2001 | Mcneilus et al. |
| 6,213,706 | B1 | 4/2001 | Christenson |
| 6,224,317 | B1 | 5/2001 | Kann et al. |
| 6,224,318 | B1 | 5/2001 | Mcneilus et al. |
| 6,315,515 | B1 | 11/2001 | Young et al. |
| 6,336,783 | B1 | 1/2002 | Young et al. |
| 6,350,098 | B1 | 2/2002 | Christenson et al. |
| 6,447,239 | B2 | 9/2002 | Young et al. |
| 6,474,928 | B1 | 11/2002 | Christenson |
| 6,565,305 | B2 | 5/2003 | Schrafel |
| 7,070,382 | B2 | 7/2006 | Pruteanu et al. |
| 7,284,943 | B2 | 10/2007 | Pruteanu et al. |
| 7,556,468 | B2 | 7/2009 | Grata |
| 7,559,735 | B2 | 7/2009 | Pruteanu et al. |
| 7,878,750 | B2 | 2/2011 | Zhou et al. |
| 8,182,194 | B2 | 5/2012 | Pruteanu et al. |
| 8,215,892 | B2 | 7/2012 | Calliari |
| 8,360,706 | B2 | 1/2013 | Addleman et al. |
| 8,540,475 | B2 | 9/2013 | Kuriakose et al. |
| 8,807,613 | B2 | 8/2014 | Howell et al. |
| 9,145,905 | B2 | 9/2015 | Hou |
| 9,216,856 | B2 | 12/2015 | Howell et al. |
| 9,284,118 | B2 | 3/2016 | Price |
| 9,387,985 | B2 | 7/2016 | Gillmore et al. |
| 9,694,776 | B2 | 7/2017 | Nelson et al. |
| 9,880,581 | B2 | 1/2018 | Kuriakose et al. |
| 9,981,803 | B2 | 5/2018 | Davis et al. |
| 10,196,205 | B2 | 2/2019 | Betz et al. |
| 10,286,239 | B2 | 5/2019 | Shively et al. |
| 10,414,067 | B2 | 9/2019 | Datema et al. |
| 10,457,533 | B2 | 10/2019 | Puszkiewicz et al. |
| 10,558,234 | B2 | 2/2020 | Kuriakose et al. |
| 10,703,356 | B2 | 7/2020 | Lacroix et al. |
| 11,254,499 | B2 | 2/2022 | Rocholl et al. |
| 11,685,599 | B2 | 6/2023 | Rocholl et al. |
| 11,964,818 | B2 * | 4/2024 | Rocholl .................. B65F 3/048 |
| 2017/0341860 | A1 | 11/2017 | Dodds et al. |
| 2017/0349374 | A1 | 12/2017 | Haddick et al. |
| 2017/0362030 | A1 | 12/2017 | Steimel |
| 2018/0250847 | A1 | 9/2018 | Wurtz et al. |
| 2018/0265289 | A1 | 9/2018 | Davis et al. |
| 2019/0091890 | A1 | 3/2019 | Rocholl et al. |
| 2019/0121353 | A1 | 4/2019 | Datema et al. |
| 2019/0161272 | A1 | 5/2019 | Betz et al. |
| 2019/0193934 | A1 | 6/2019 | Rocholl et al. |
| 2019/0262643 | A1 | 8/2019 | Shively et al. |
| 2019/0322321 | A1 | 10/2019 | Schwartz et al. |
| 2019/0325220 | A1 | 10/2019 | Wildgrube et al. |
| 2019/0360600 | A1 | 11/2019 | Jax et al. |
| 2020/0031641 | A1 | 1/2020 | Puszkiewicz et al. |
| 2020/0078986 | A1 | 3/2020 | Clifton et al. |
| 2020/0102145 | A1 | 4/2020 | Nelson et al. |
| 2020/0230841 | A1 | 7/2020 | Datema et al. |
| 2020/0230842 | A1 | 7/2020 | Datema et al. |

* cited by examiner

FRONT LIFT ASSEMBLY FOR ELECTRIC REFUSE VEHICLE

CROSS-REFERENCE TO RELATED PATENT APPLICATIONS

This application is a continuation of U.S. patent application Ser. No. 18/196,334, filed May 11, 2023, which is a continuation of U.S. patent application Ser. No. 17/674,652, filed Feb. 17, 2022, which is a continuation of U.S. patent application Ser. No. 16/851,844, filed Apr. 17, 2020, which claims the benefit of and priority to U.S. Provisional Patent Application No. 62/843,052, filed May 3, 2019, all of which are incorporated herein by reference in their entireties.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to a refuse vehicle. The refuse vehicle includes a chassis, a body assembly coupled to the chassis where the body assembly defines a refuse compartment, and a lift assembly. The lift assembly includes a first lift arm, a second lift arm, a pair of forks, and a lift arm actuator assembly. The lift arm actuator assembly includes a first electric lift actuator positioned proximate the first lift arm, a second electric lift actuator positioned proximate the second lift arm where the first electric lift actuator and the second electric lift actuator are configured to pivot the first lift arm and the second lift arm, and one or more electric fork actuators configured to pivot the pair of forks relative to the first lift arm and the second lift arm.

Another embodiment relates to a refuse vehicle. The refuse vehicle includes a chassis, a body assembly coupled to the chassis where the body assembly defines a refuse compartment, and a lift assembly. The lift assembly includes a first lift arm, a second lift arm, and a lift arm actuator assembly configured to pivot the first lift arm and the second lift arm. The lift arm actuator assembly includes an electric lift motor and a gear assembly coupled to the electric lift motor.

Another embodiment relates to a refuse vehicle. The refuse vehicle includes a chassis, a body assembly coupled to the chassis where the body assembly defines a refuse compartment, and a lift assembly. The lift assembly includes a first lift arm, a second lift arm, a lift arm actuator assembly configured to pivot the first lift arm and the second lift arm, a fork shaft extending between the first lift arm and the second lift arm, a pair of forks coupled to the fork shaft, and an electric fork actuator configured to pivot the pair of forks relative to the first lift arm and the second lift arm. The electric fork actuator includes an electric fork motor and a gear assembly coupling the electric fork motor to the fork shaft. An output of the electric fork motor is oriented perpendicular to the fork shaft.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a refuse vehicle includes a front lift assembly having lift arms coupled to a body of the refuse vehicle, a fork assembly coupled to the lift arms, one or more first electric actuators coupled to the lift arms, and a pair of second electric actuators extending between the lift arms and the fork assembly. In some embodiments, the one or more first electric actuators are linear actuators. In some embodiments, the one or more first electric actuators are rotational actuators. The one or more first electric actuators are configured to facilitate pivoting the lift arms relative to the body. According to an exemplary embodiment, the pair of second electric actuators are linear actuators. The pair of second electric actuators are configured to facilitate pivoting the fork assembly relative to the lift arms.

Overall Vehicle

Figure 1:
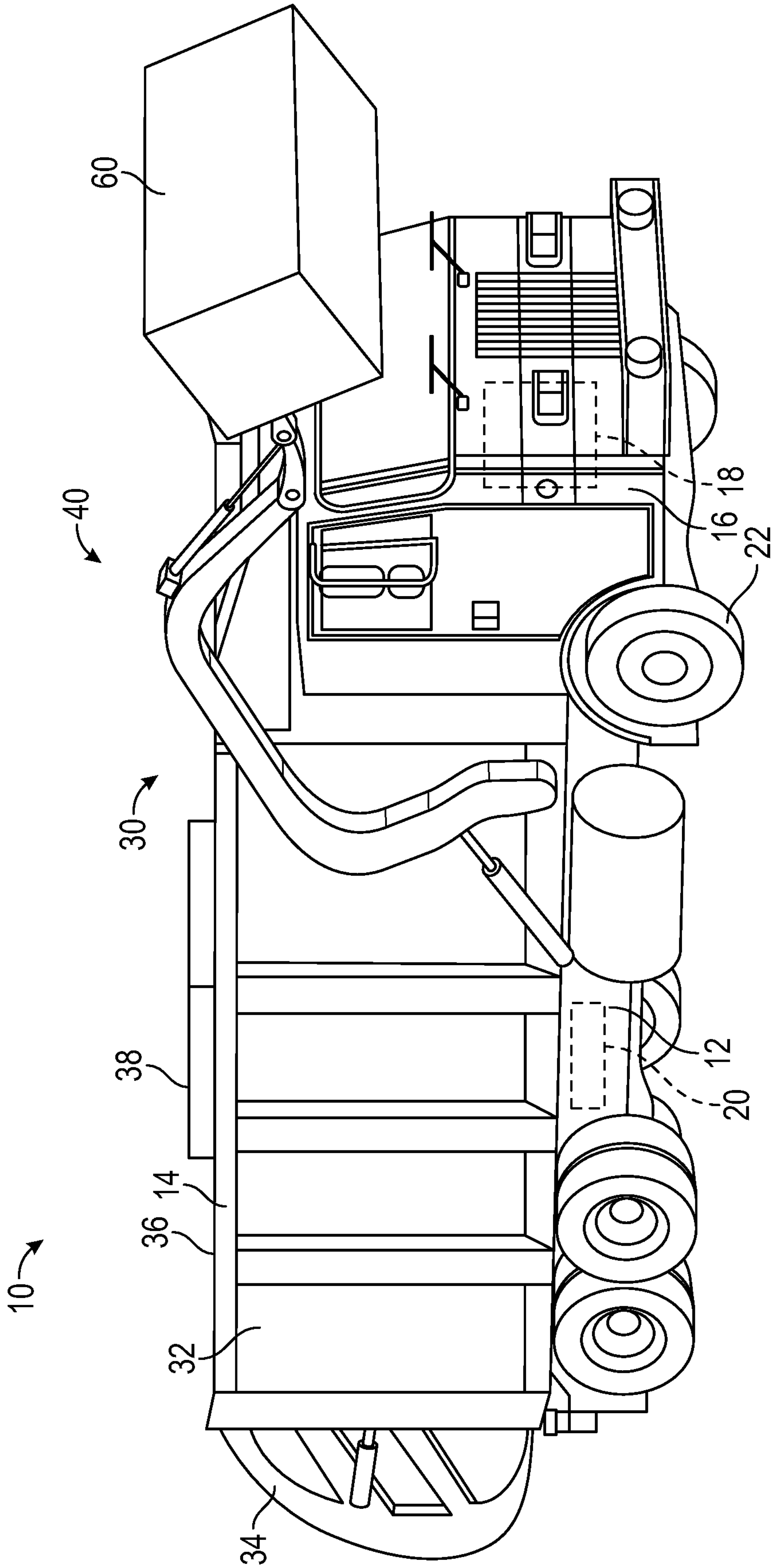
FIG. 1 is a perspective view of a refuse vehicle, according to an exemplary embodiment.

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck. In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.).

As shown in FIG. 1, the refuse vehicle 10 includes a prime mover, shown as electric motor 18, and an energy system, shown as energy storage and/or generation system 20. In other embodiments, the prime mover is or includes an internal combustion engine. According to the exemplary embodiment shown in FIG. 1, the electric motor 18 is coupled to the frame 12 at a position beneath the cab 16. The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independently driving one or more of the wheels 22. In still other embodiments, the electric motor 18 or a secondary electric motor is coupled to and configured to drive a hydraulic system that powers hydraulic actuators. According to the exemplary embodiment shown in FIG. 1, the energy storage and/or generation system 20 is coupled to the frame 12 beneath the body 14. In other embodiments, the energy storage and/or generation system 20 is otherwise positioned (e.g., within a tailgate of the refuse vehicle 10, beneath the cab 16, along the top of the body 14, within the body 14, etc.).

According to an exemplary embodiment, the energy storage and/or generation system 20 is configured to (a) receive, generate, and/or store power and (b) provide electric power to (i) the electric motor 18 to drive the wheels 22, (ii) electric actuators of the refuse vehicle 10 to facilitate operation thereof (e.g., lift actuators, tailgate actuators, packer actuators, grabber actuators, etc.), and/or (iii) other electrically operated accessories of the refuse vehicle 10 (e.g., displays, lights, etc.). The energy storage and/or generation system 20 may include one or more rechargeable batteries (e.g., lithium-ion batteries, nickel-metal hydride batteries, lithium-ion polymer batteries, lead-acid batteries, nickel-cadmium batteries, etc.), capacitors, solar cells, generators, power buses, etc. In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity to charge the energy storage and/or generation system 20, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22. The energy storage and/or generation system 20 may thereby be charged via an on-board generator (e.g., an internal combustion generator, a solar panel system, etc.), from an external power source (e.g., overhead power lines, mains power source through a charging input, etc.), and/or via a power regenerative braking system, and provide power to the electrically operated systems of the refuse vehicle 10. In some embodiments, the energy storage and/or generation system 20 includes a heat management system (e.g., liquid cooling, heat exchanger, air cooling, etc.).

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, a front-loading refuse vehicle, a side-loading refuse vehicle, etc.). In other embodiments, the storage volume is positioned between the hopper volume and the cab 16 (e.g., a rear-loading refuse vehicle, etc.).

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 60.

The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.).

Front Lift Assembly

Figure 2:
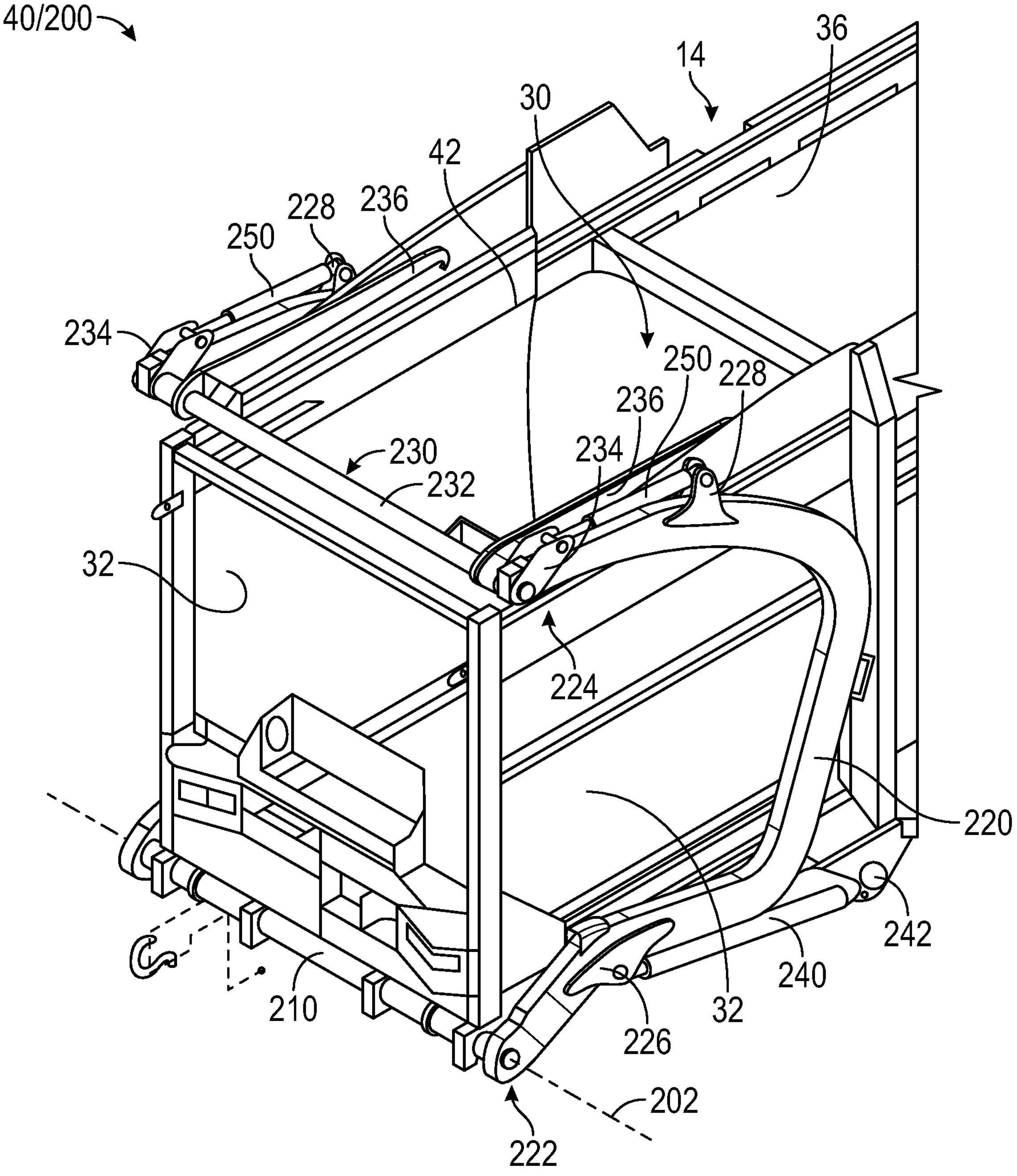
FIG. 2 is a perspective view of a lift assembly of the vehicle of FIG. 1, according to an exemplary embodiment.
Figure 3:
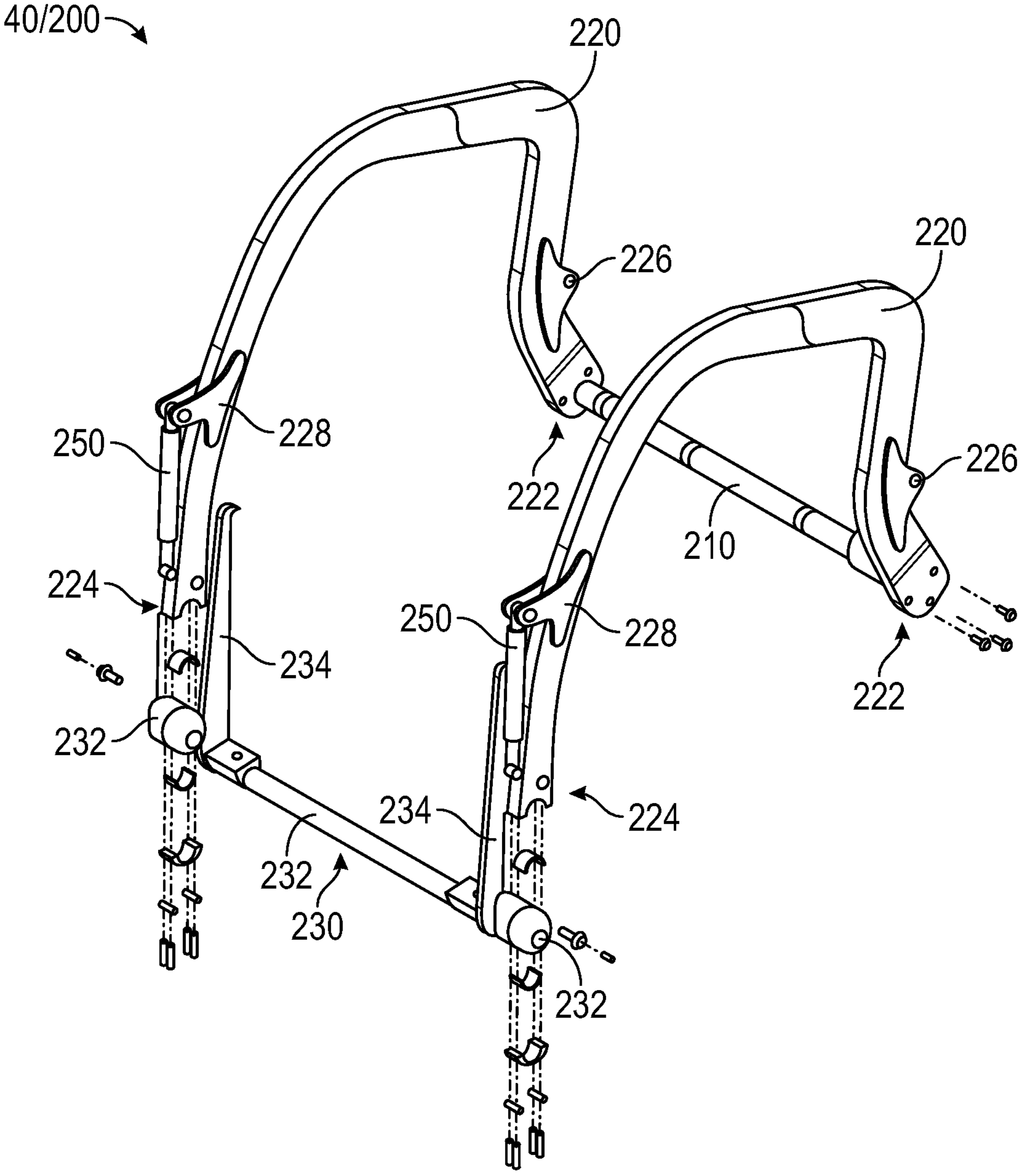
FIG. 3 is a detailed view of the lift assembly of FIG. 2, according to an exemplary embodiment.
Figure 4:
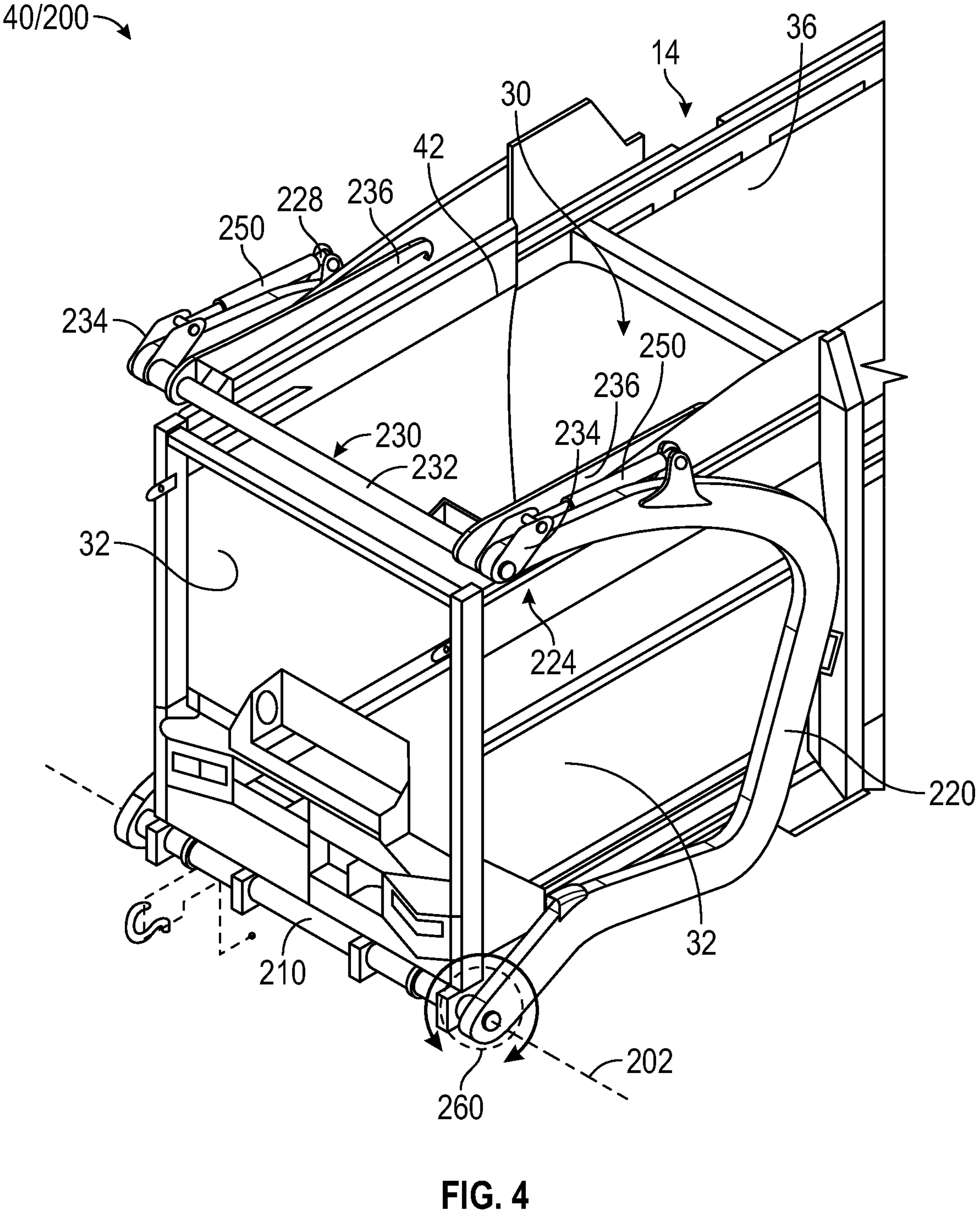
FIG. 4 is a perspective view of a lift assembly of the vehicle of FIG. 1, according to another exemplary embodiment.

As shown in FIGS. 2-9, the lift assembly 40 is configured as a front-loading lift assembly, shown as lift assembly 200. According to an exemplary embodiment, the lift assembly 200 is configured to facilitate lifting the refuse container 60 over the cab 16 to dump the contents therein (e.g., trash, recyclables, etc.) into the refuse compartment 30 through an opening, shown as hopper opening 42, in the cover 36 of the body 14. As shown in FIGS. 2-4, the lift assembly 200 includes a rotational coupler, shown as pin 210, extending laterally between the panels 32 of the body 14 at the front end thereof; a pair of lift arms, shown as lift arms 220, having (i) first ends, shown as pin ends 222, pivotally coupled to the body 14 at opposing ends of the pin 210 and (ii) second ends, shown as fork ends 224; and a fork assembly, shown as fork assembly 230, pivotally coupled to the fork ends 224 of the lift arms 220. The fork assembly 230 includes a lateral member, shown as fork shaft 232; a pair of brackets, shown as fork brackets 234, coupled to opposing ends of the fork shaft 232 and coupled to the fork ends 224 of the lift arms; and a pair of forks, shown as forks 236, coupled to opposing ends of the fork shaft 232, inside of the fork brackets 234.

As shown in FIGS. 2 and 3, each of the lift arms 220 includes a first bracket, shown as lift arm actuator bracket 226, positioned proximate the pin end 222 thereof. As shown in FIG. 2, the body 14 defines an interface, shown as actuator interface 242, on a first lateral side of the body 14. According to an exemplary embodiment, the body 14 defines a similar actuator interface 242 on the opposing lateral side of the body 14. As shown in FIG. 2, the lift assembly 200 includes a pair of first actuators, shown as lift arm actuators 240, extending between the lift arm actuator brackets 226 and the actuator interfaces 242. According to an exemplary embodiment, the lift arm actuators 240 are linear actuators configured to extend and retract to pivot the lift arms 220 and the fork assembly 230 about a lateral axis, shown as pivot axis 202, defined by the pin 210. According to an exemplary embodiment, the lift arm actuators 240 are electric actuators configured to be powered via electricity provided by the energy storage and/or generation system 20 or another electrical source on the refuse vehicle 10 (e.g., a generator, solar panels, etc.). In one embodiment, the lift arm actuators 240 are or include ball screws driven by an electric motor. In other embodiments, another type of electrically driven, linear actuator is used (e.g., a lead screw actuator, etc.). In an alternative embodiment, the lift arm actuators 240 are hydraulic cylinders driven by an electronically driven hydraulic pump (e.g., driven by the electric motor 18, the secondary electric motor, etc.).

As shown in FIGS. 2-4, each of the lift arms 220 includes a second bracket, shown as fork actuator bracket 228, positioned proximate the fork end 224 thereof. As shown in FIGS. 2-4, the lift assembly 200 includes a pair of second actuators, shown as fork actuators 350, extending between the fork actuator brackets 228 and the fork brackets 234 of the fork assembly 230. According to an exemplary embodiment, the fork actuators 250 are linear actuators configured to extend and retract to pivot the fork assembly 230 (e.g., the forks 236, etc.) relative to the fork ends 224 of the lift arms 220. According to an exemplary embodiment, the fork actuators 250 are electric actuators configured to be powered via electricity provided by the energy storage and/or generation system 20 or another electrical source on the refuse vehicle 10 (e.g., a generator, solar panels, etc.). In one embodiment, the fork actuators 250 are or include ball screws driven by an electric motor. In other embodiments, another type of electrically driven, linear actuator is used (e.g., a lead screw actuator, etc.). In an alternative embodiment, the fork actuators 250 are hydraulic cylinders driven by an electronically driven hydraulic pump (e.g., driven by the electric motor 18, the secondary electric motor, etc.).

As shown in FIG. 4, the lift assembly 200 does not include the lift arm actuators 240. Rather, the lift assembly 200 includes at least one third actuator, shown as lift arm actuator 260. According to the various exemplary embodiments shown as FIGS. 5-9, the lift arm actuator 260 is a rotational actuator assembly configured to pivot the lift arms 220 and the fork assembly 230 about the pivot axis 202. According to an exemplary embodiment, the lift arm actuators 260 are electric actuators configured to be powered via electricity provided by the energy storage and/or generation system 20 or another electrical source on the refuse vehicle 10 (e.g., a generator, solar panels, etc.). In an alternative embodiment, the lift arm actuator 260 is a hydraulic actuator driven by an electronically driven hydraulic pump (e.g., driven by the electric motor 18, the secondary electric motor, etc.). In some embodiments, the lift arm actuator 260 is coupled to one end of the pin 210. In some embodiments, the lift arm actuator 260 is coupled to the pin 210 at a location between the ends thereof (e.g., at the center of the pin 210, at least a portion of the lift arm actuator 260 is positioned beneath the body 14, etc.). In some embodiments, the lift assembly 200 includes a pair of lift arm actuators 260. In one embodiment, the lift arm actuators 260 are coupled to opposing ends of the pin 210. In another embodiment, the lift arm actuators 260 are coupled to the pin 210 at a location there along that is spaced from the ends thereof.

Figure 5:
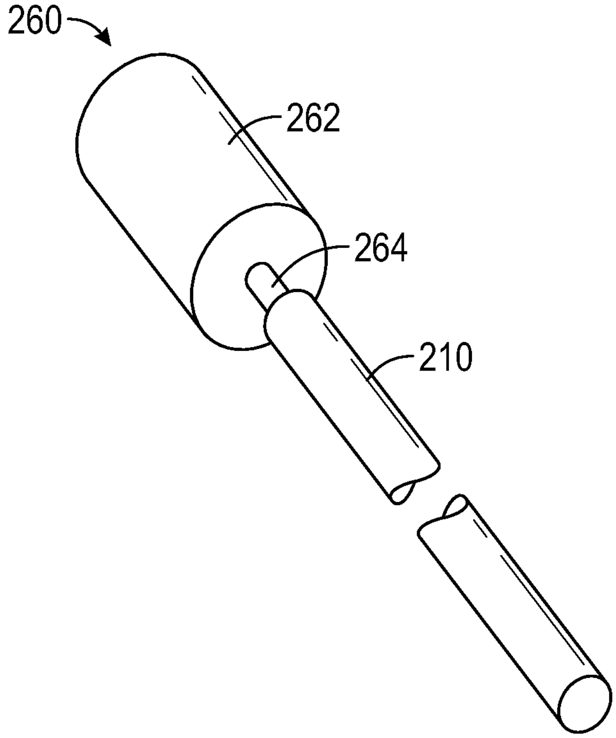
FIGS. 5-9 are various views of an actuator assembly of the lift assembly of FIG. 4, according to various exemplary embodiments.
Figure 6:
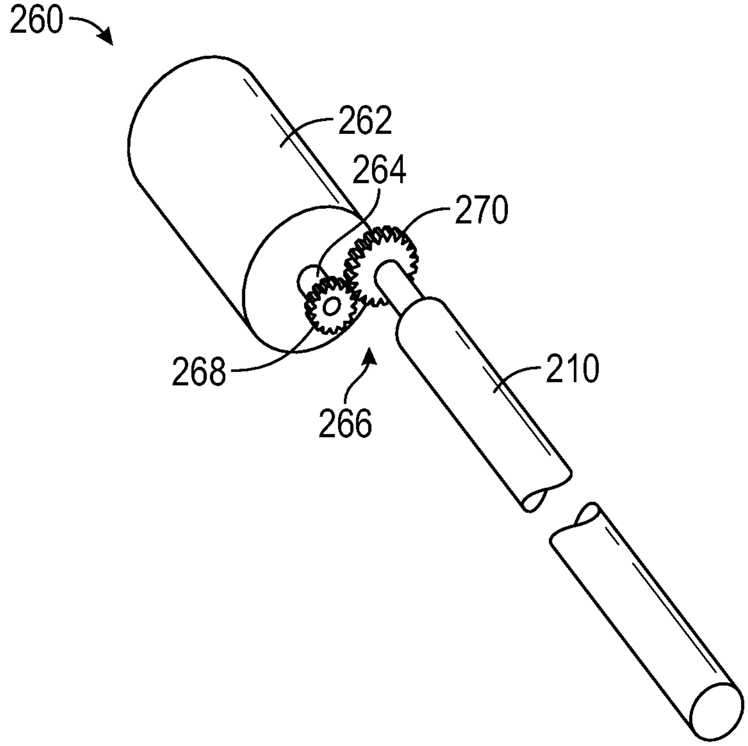

As shown in FIGS. 5 and 6, the lift arm actuator 260 includes a motor, shown as electric motor 262, having an output, shown as output shaft 264, arranged in parallel with the pin 210. As shown in FIG. 5, the output shaft 264 of the electric motor 262 is directly coupled to and aligned with the pin 210 to facilitate driving rotation of the pin 210, the lift arms 220, and the fork assembly 230 about the pivot axis 202 (i.e., the output shaft 264 is in line with the pivot axis 202).

As shown in FIG. 6, the lift arm actuator 260 includes a gear assembly, shown as gear assembly 266, including a first gear, shown as gear 268, coupled to the output shaft 264 of the electric motor 262 and a second gear, shown as gear 270, coupled to the pin 210 and in engagement with the gear 268 to facilitate driving rotation of the pin 210, the lift arms 220, and the fork assembly 230 about the pivot axis 202 (i.e., the output shaft 264 is offset relative to the pivot axis 202). In one embodiment, the gear 268 has a smaller diameter that the gear 270. In another embodiment, the gear 268 has a larger diameter that the gear 270. In other embodiments, the gear assembly 266 has more than two gears. In still other embodiments, the gear assembly 266 has variable gearing (e.g., a gearbox, a transmission, etc.). In yet other embodiments, the gear assembly 266 is a planetary gear set.

Figure 7:
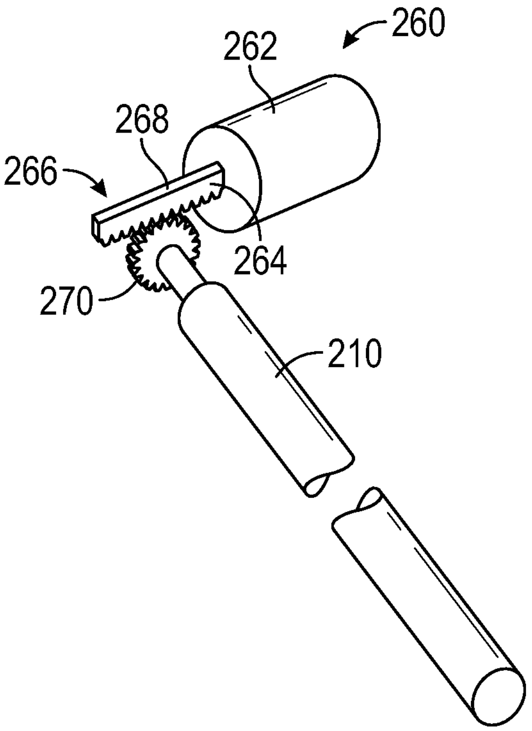
Figure 8:
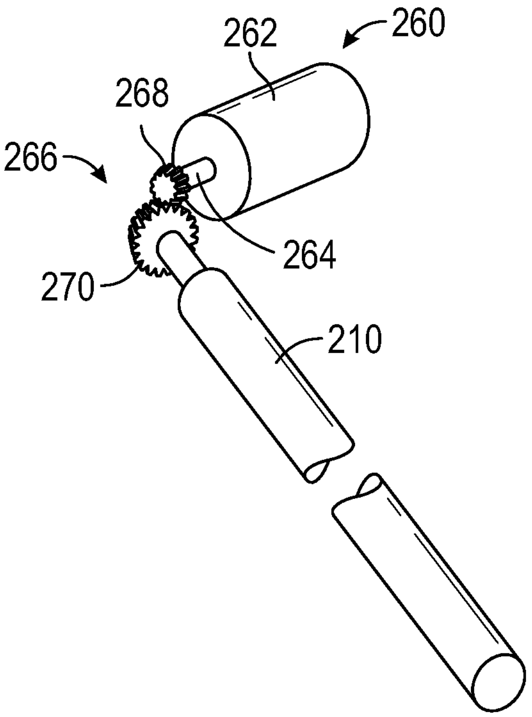

As shown in FIGS. 7 and 8, the output shaft 264 of the electric motor 262 is arranged perpendicular to the pin 210 and the pivot axis 202. As shown in FIG. 7, the gear 268 is configured as a screw gear configured to engage the gear 270. As shown in FIG. 8, the gear 268 is configured as a bevel gear configured to engage the gear 270, which is also configured as a bevel gear.

Figure 9:
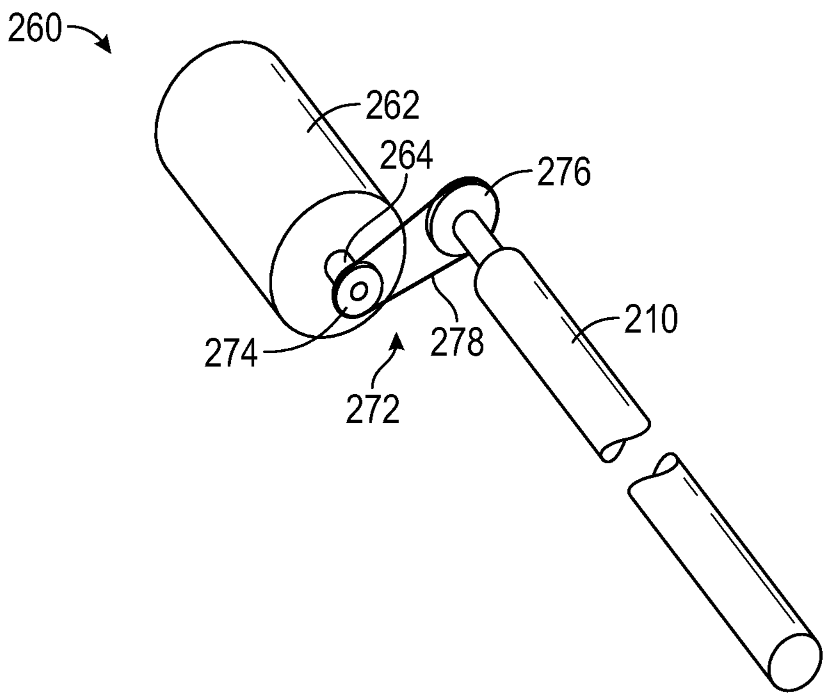

As shown in FIG. 9, the output shaft 264 of the electric motor 262 is arranged in parallel with the pin 210 and offset from the pivot axis 202. As shown in FIG. 9, the lift arm actuator 260 includes a pulley assembly, shown as pulley assembly 272, including a first pulley, shown as pulley 274, coupled to the output shaft 264 of the electric motor 262; a second pulley, shown as pulley 276, coupled to the pin 210; and a connector (e.g., a belt, chain, etc.), shown as pulley connector 278, rotationally coupling the pulley 276 to the pulley 274 to facilitate driving rotation of the pin 210, the lift arms 220, and the fork assembly 230 about the pivot axis 202. In one embodiment, the pulley 274 has a smaller diameter that the pulley 276. In another embodiment, the pulley 274 has a larger diameter that the pulley 276. In other embodiments, the pulley assembly 272 has more than two pulleys (e.g., a third pulley, a tensioner, etc.). In still other embodiments, the pulley assembly 272 is a variable pulley assembly (e.g., a continuously variable transmission ("CVT"), etc.).

Figure 10:
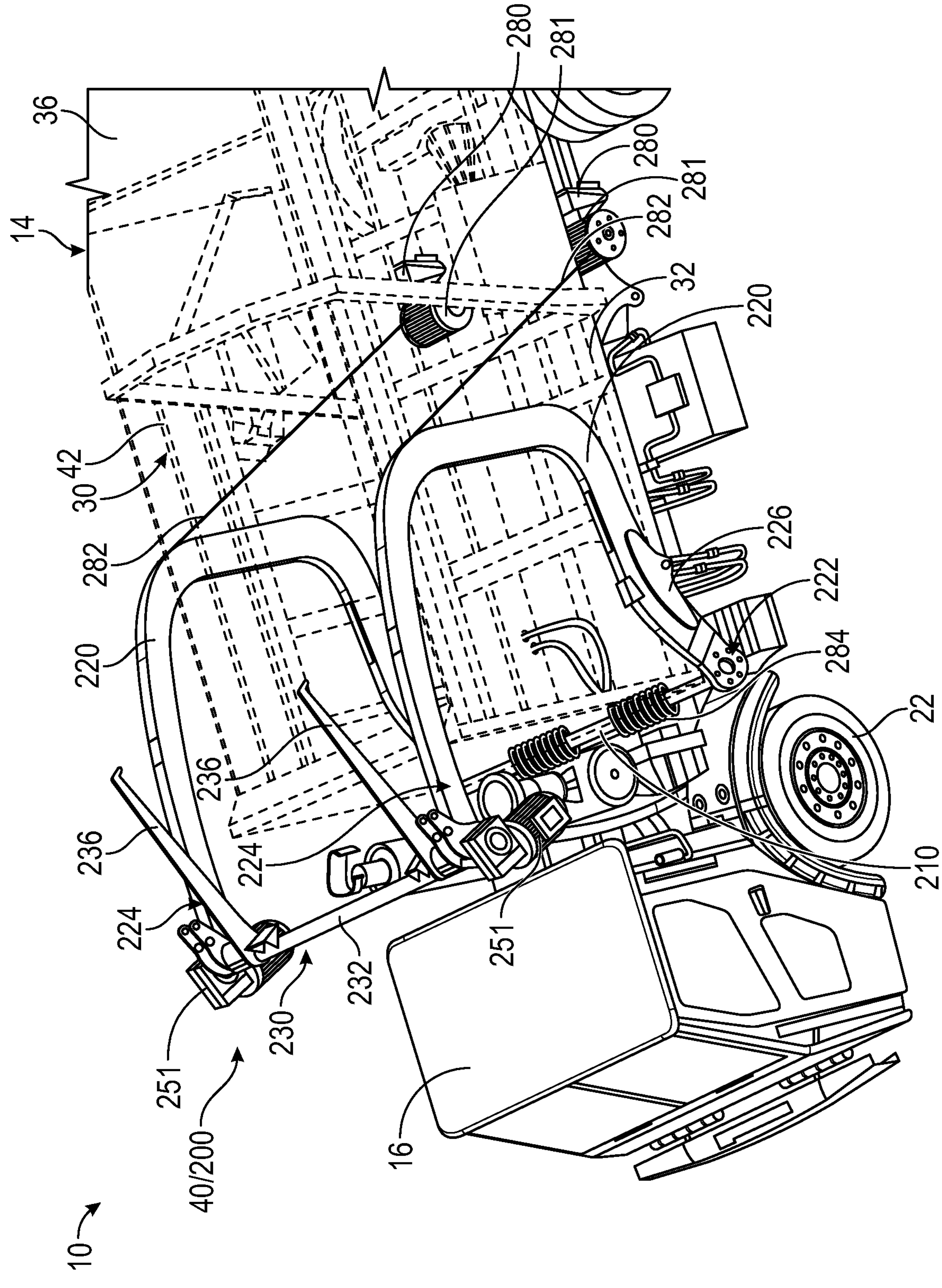
FIG. 10 is a perspective view of another possible actuator assembly of the lift assembly, according to another exemplary embodiment.
Figure 11:
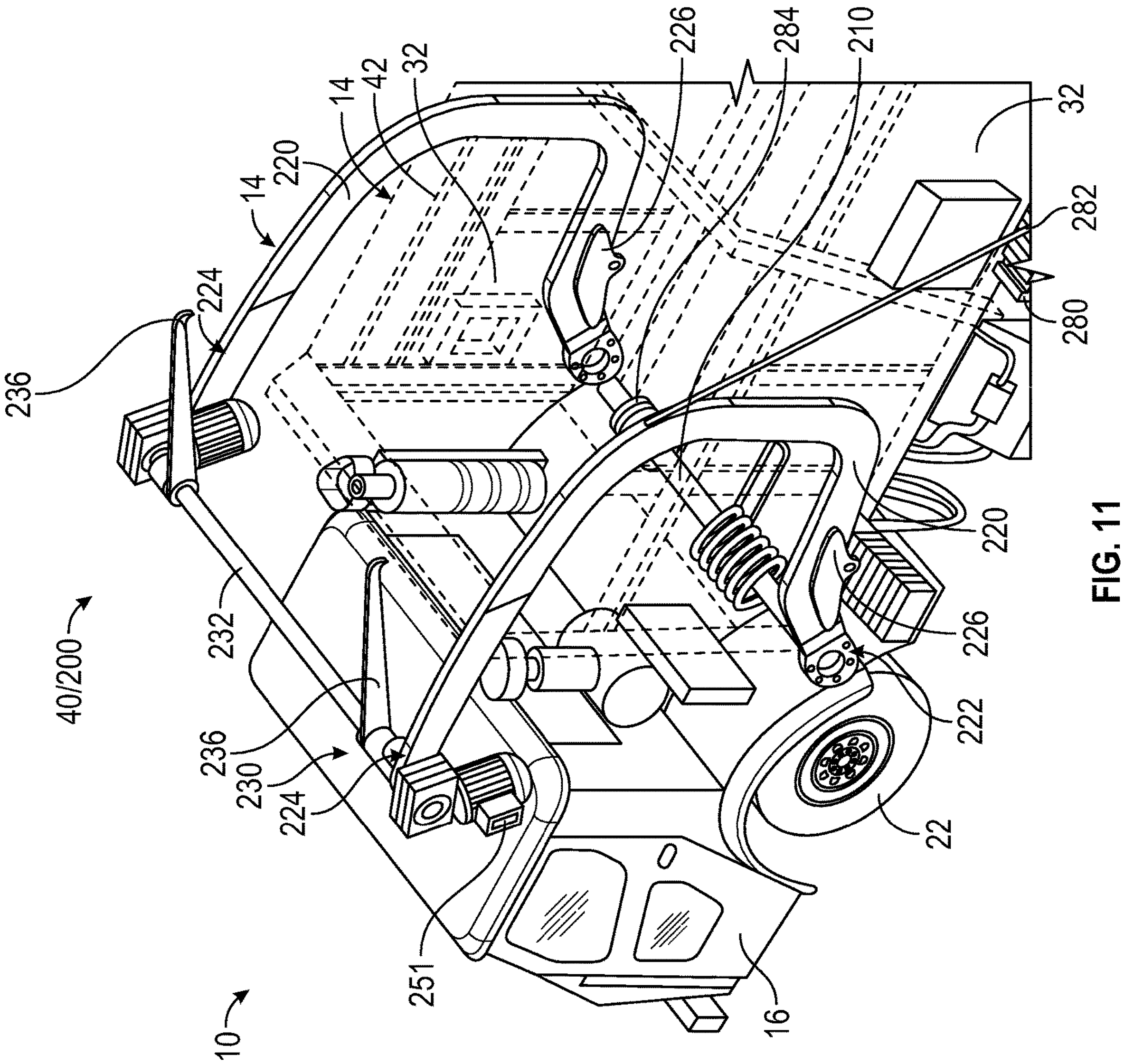
FIG. 11 is a rear perspective view of the actuator assembly of FIG. 10.

As shown in FIG. 10, the lift assembly 200 does not include the lift arm actuators 240 or 240. Rather, the lift assembly 200 includes at least one fourth lift arm actuator, shown as lift arm actuator 280. According to the exemplary embodiment shown in FIGS. 10-11, the lift arm actuator 280 is an electric winch type actuator coupled to and configured to pivot the lift arms 220 and the fork assembly 230 about the pivot axis 202 through the cable 282. The lift arm actuator 280 receives and provides the respective cable 282 providing a tension to the cable 282 as it receives the cable 282. In the embodiment shown, there is two lift arm actuators 280, one for each lift arm 220. In other embodiments, there may be a single lift arm actuator 280 and the cable 282 may couple the single lift arm actuator 280 to both lift arms 220. According to an exemplary embodiment, the lift arm actuators 280 are electric winches configured to be powered via electricity provided by the energy storage and/or generation system 20 or another electrical source on the refuse vehicle 10 (e.g., a generator, solar panels, etc.). The lift arm actuators 280 (e.g., the electric winch actuators) include a winch drum 281, an electric motor, one or more gear assemblies, and the cable 282. The winch drum 281 is what the cable 282 wraps about when it is being pulled in via the electric motor. In some embodiments, the winch drum 281 includes a cover. The lift arm actuators 280 are coupled to the body 14 and the respective lift arms 220 via the respective cables 282. The lift assembly 200 further includes a large torsion spring 284 that is coupled to and wrapped about the pin 210. The torsion spring 284 provides a torsional force to the pin 210 and therefore the lift arms 220 that prevents the lift arms 220 from getting caught as the lift arms 220 reach the hopper 30. As shown in FIG. 10-11, if the pin 210 did not include the torsion spring 284, the lift arms 220 would be stuck when they reach the highest position, as the cable 282 cannot readily provide a pushing force. As also shown in FIGS. 10-11, the fork assembly 230 does not include the fork actuators 250 but rather includes the fork actuators 251. The fork actuators 251 will be described in further detail herein, but may be any form of actuator that provides a rotational motion of the forks 236 (i.e., rotates the forks 236 relative to the lift arms 220).

In operation, the lift arm actuators 280 provided a pulling force (tension) on the lift arms 220 through the cables 282, as the cables 282 are received by the lift arm actuators 280. This force causes the lift arms 220 to rotate about the pin 210. As the lift arms 220 rotate closer to the hopper 30, the torsion spring 284 starts to become loaded with a resistance force. The lift arm actuators 280 are able to overcome this force and continue rotating the lift arms 220 until they are generally vertical. At this point, the lift arm actuators 280 may include a limit switch that prevents them from providing any additional tension to the cables 282. This may prevent damage to the lift assembly 200. In other embodiments, the lift arm actuators 280 cannot overcome the force of the torsion spring 284 once the lift arms 220 reach a generally vertical orientation. At this point, the fork actuator 251 rotates the forks 236 about the fork shaft 232. To lower the fork assembly 230 and the lift arms 220, the lift arm actuators 280 release the tension provided to the lift arms 220 through the cables 282. At this point, the torsion spring 284 is strong enough to overcome the weight of the lift arms 220 and the fork assembly 230 and both are lowered. Gravity may then continue to pull the lift arms 220 and the fork assembly 230 down as the lift arm actuators 280 unwind the cables 282. In this way, the lift arm actuators 280 pivot the lift arms 220 relative to the body 14.

Figure 12:
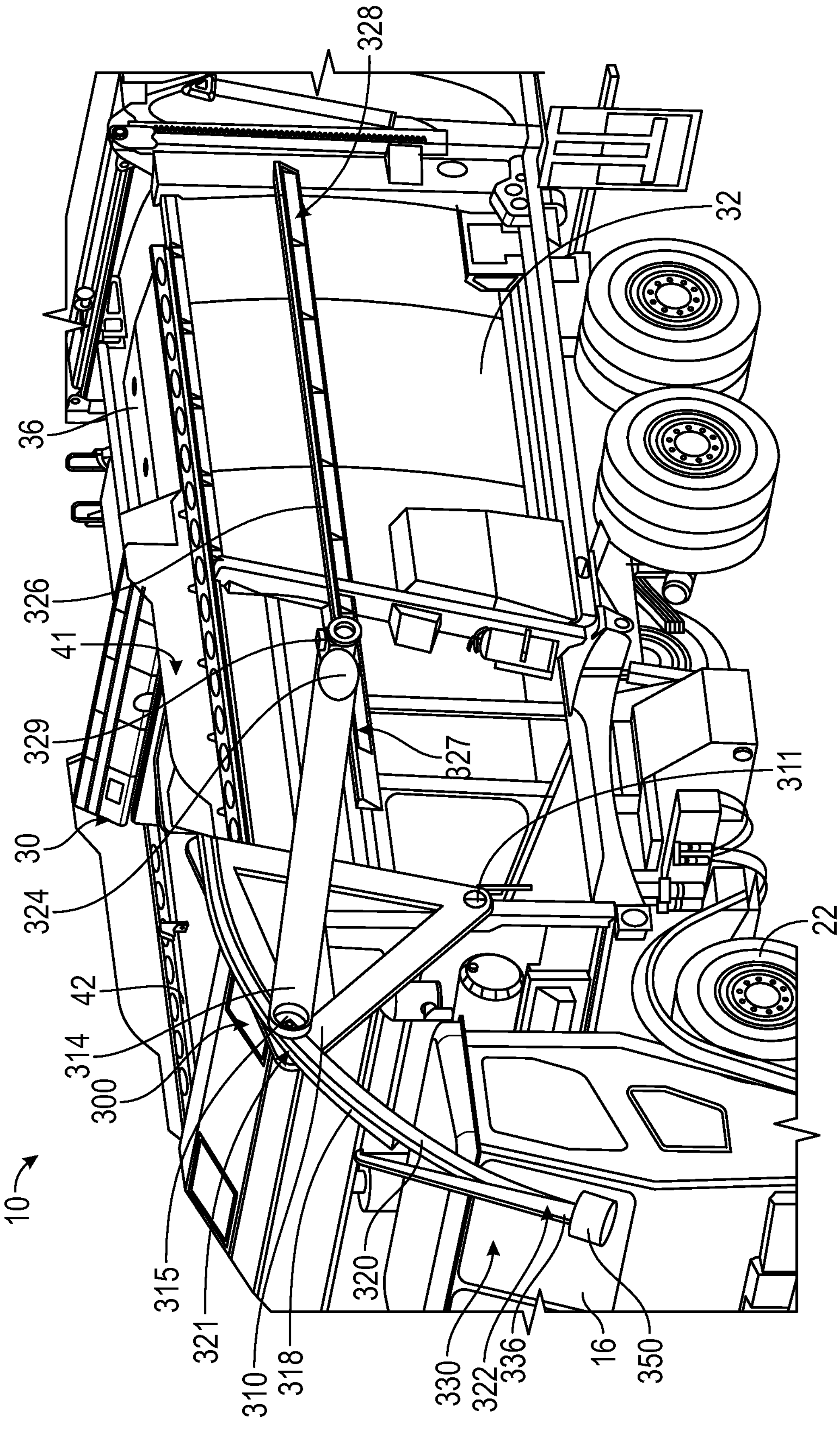
FIG. 12 is a perspective view of a second lift assembly of the vehicle of FIG. 1, according to another exemplary embodiment.
Figure 13:
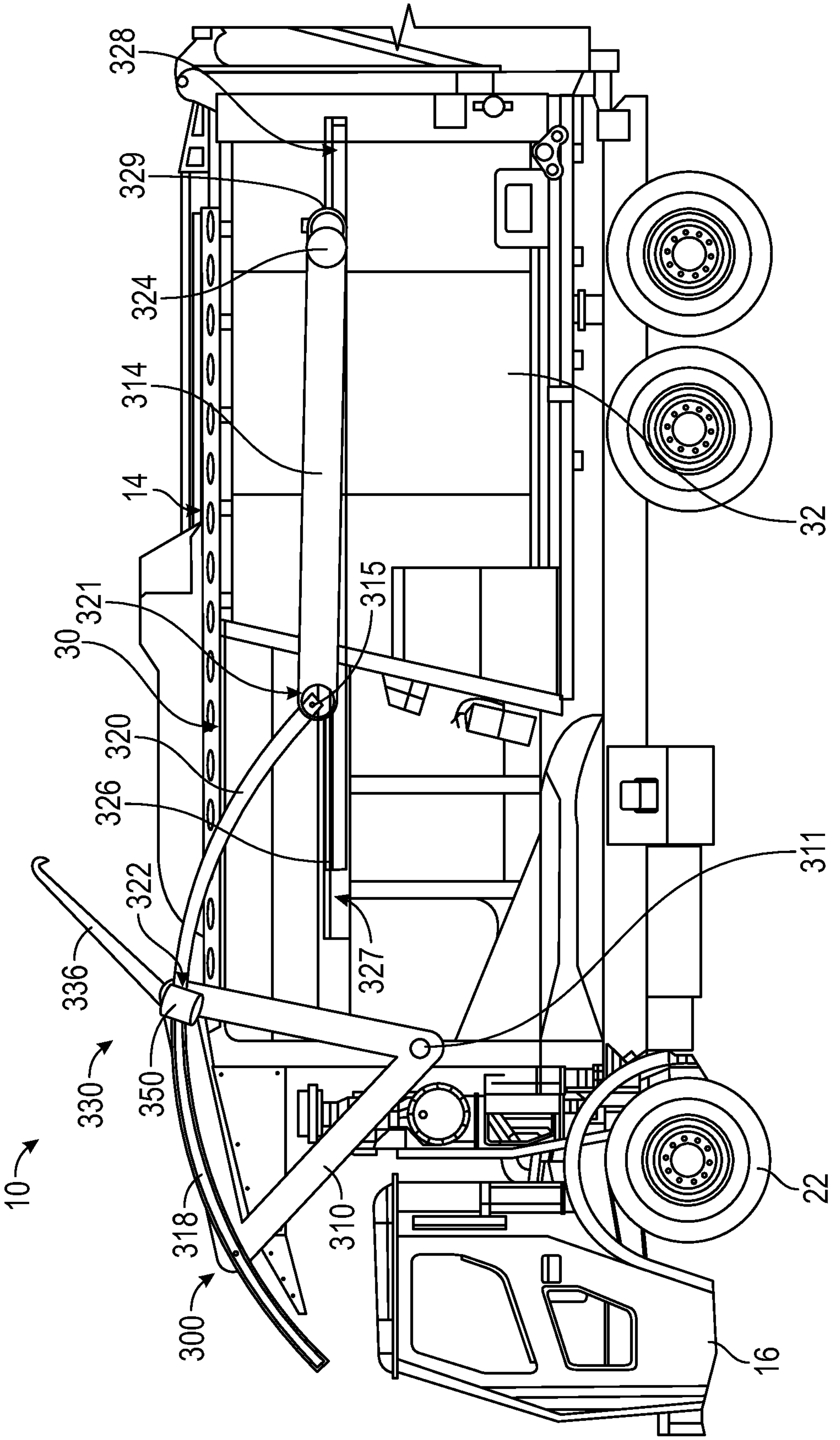
FIG. 13 is a side view of the second lift assembly of FIG. 12.

Referring now to FIGS. 12-13, a lift assembly 300 is shown. The lift assembly 300 is implemented in place of the lift assembly 200, while providing a similar function (e.g., the raising and lowering of a fork assembly 330). The lift assembly 300 may include one or more frames 310 and one or more connecting rods 314. Each frame 310 is shown to include three rods and provide the structure for many components of the lift assembly 300. In some embodiments, the frame 310 may include more or less than three rods (e.g., 1, 2, 4, 5, or more rods). In even other embodiments, the frame 310 is one single piece formed through welding, casting, or other similar processes. The frame 310 is fixedly coupled to the body 14 at one or more connection points 311. The lift assembly 300 further includes two or more connecting rods 314, one or more rails 318, and one or more lift arms 320. The rail 318 is fixedly coupled to the at least one frame 310 and is generally (i.e., is at least partially) a curved shape. Each rail 318 is configured to fixedly receive a connecting surface (not shown) of the respective lift arm 320. The connecting surface is a surface that runs the length of the lift arm 320 and interfaces with (is received by) the rail 318. Each connecting surface provides a constant connection between the respective lift arm 320 and the rail 318. In this way, each lift arm 320 may translate along the curved path of the respective rail 318. Each lift arm 320 further includes a fork end 322 and a connecting end 321.

Each lift arm 320 is coupled to the respective connecting rod 314 at the connecting end 321 through a pivotal connection 315. The pivotal connection 315 allows the connecting rod 314 to pivot with respect to the connecting end 321 of the lift arm 320 while staying coupled. At an end opposite to the pivotal connection 315, the connecting rod 314 is coupled to a pinion 324. As shown in FIGS. 11-12, the lift assembly 300 further includes at least one pinion 324, at least one rack 326 having a first end 327 and a second end 328, and at least one electric motor 329. The rack 326 is coupled to the body 14 and includes one or more gear teeth. Together, the pinion 324, the rack 326, and the electric motor 329 provide the force necessary to move (lift) the lift arm 320 along the rail 318. The electric motor 329 is electrically coupled to and receives power from the energy storage and/or generation system 20. The electric motor 329 then converts the electric power into mechanical torque. The torque is provided to the pinion 324 through an output shaft of the electric motor 329. The pinion 324 is coupled to the electric motor 329, the pivotal connection 315, and movably coupled to the rack 326 through one or more gear teeth. Both the pinion 324 and the rack 326 have the same diametral pitch and include multiple gear teeth in contact. In this way, the teeth of the rack 326 and the pinion 324 mesh. As the pinion 324 rotates about the output shaft of the electric motor 329, the pinion moves along the rack 326 pulling itself along and creating a linear force through the connecting rod 314. This linear force pulls the lift arm 320 along the rail 318, raising or lowering the fork end 322 of the lift arm 320. In this way, the rack 326 and pinion 324 rotate/move the lift arm 320 relative to the body 14.

The lift assembly 300 further includes one or more fork assemblies 330. The fork assembly comprises two or more forks 336 and one or more fork actuators 350. In some embodiments, there is fork actuator 350 for each fork 336. In other embodiments, a single fork actuator 350 operates two or more forks 336. Each fork actuator 350 is configured to rotate the respective fork 336 about the fork end 322 and will be described further herein (i.e. rotate the forks 336 relative to the body 14 and/or the lift arm 320. In some embodiments, the fork assembly 330 further includes a bar connecting the two forks 336 together (similar to the fork shaft 232) around which the fork actuator 350 rotates the respective forks 336.

In operation, the pinion 324 is rotated by the electric motor 329 and moves between the first end 327 (shown in FIG. 12) and the second end 328 (shown in FIG. 13) of the rack 326. When the pinion 324 is at the first end 327, the lift arm 320 is at approximately the lowest point. In this position the forks 336 may receive or position under the refuse container 60. From there, the electric motor 329 drives the pinion 324 along the rack 326. As the pinion 324 moves, the connecting rod 314 moves along with it. The connecting rod 314 then pulls the lift arm 320 along the rail 318 as well the fork assembly 330 coupled thereto. Once the pinion 324 reaches the second end 328 of the rack 326, the forks 336 are at their highest position. At this point, the forks 336 may rotate about the fork end 322 through the fork actuator 350 and empty the refuse container 60. To then lower the fork assembly 330 and the lift arm 320, the pinion 324 moves in the opposite direction, toward the first end 327 of the rack 326. In this way, the lift arm 320 is both pushed along the rail 318 by the connecting rod 314 and pulled down by gravity. The pinion 324 preventing the lift arm 320 from falling downward. It should be noted that while the pinion 324 is traveling between the first end 327 and the second end 328 of the rack 326, the fork actuator 350 must keep the forks 336 level. As the forks 336 are lifting the refuse container 60 it is important that the fork 336 stay level or the refuse container 60 may fall or lose debris.

While the embodiment shown in FIGS. 12-13 only shows a single side of the lift assembly 300, the lift assembly 300 includes another side including the same components of the side shown (the rail 318, the frame 310, the pinion 324, etc.). In another embodiment, the fork assembly 330 includes two forks 336 (e.g., one on each side), but the lift assembly 360 only includes a single rail 318, frame 310, connecting rod 314, lift arm 320, rack 326, pinion 324, and electric motor 329. In this way, the components of the lift assembly 300 facilitate the raising and lowering of the two forks 336.

Figure 14:
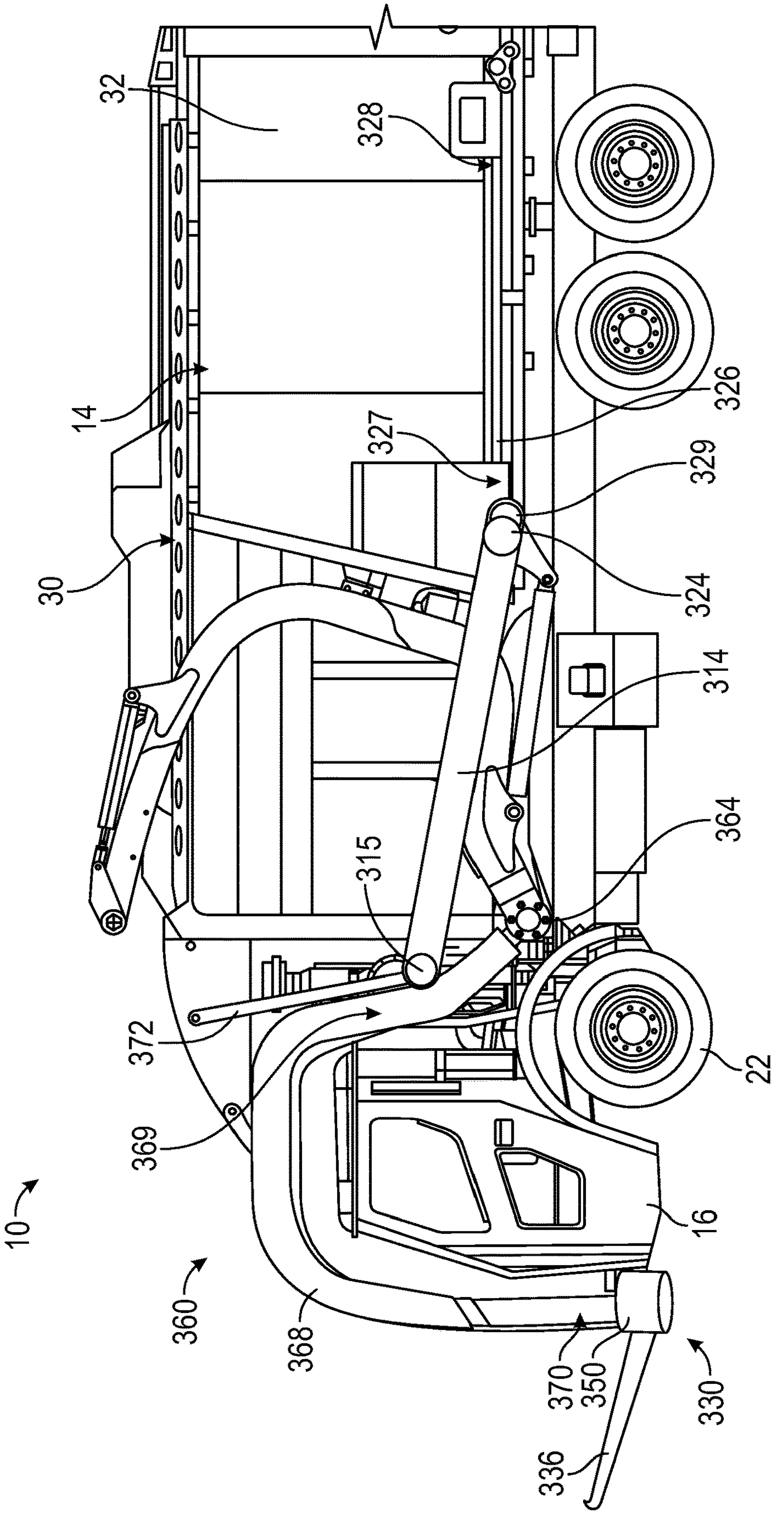
FIG. 14 is a perspective view of a third lift assembly of the vehicle of FIG. 1, according to another exemplary embodiment.

Referring now to FIG. 14, a lift assembly 360 is shown. The lift assembly 360 operates similar to the lift assembly 300 and includes the same reference numbers for components that have not changed. For example, the lift assembly 360 includes the fork assembly 330, the connecting rod 314, the rack 326, the pinion 324, and the electric motor 329. In the lift assembly 360, the rack 326 is located relatively lower than the rack 326 on the lift assembly 300 but serves the same function. The lift assembly 360 however does not include the lift arm 320, rail 318, or frame 310 but rather includes the lift arm 368. The lift arm 368 is similar to the lift arms 220 and includes a pin end 369 at which a pin 364 is located and a fork end 370 at which the fork assembly 330 is located. The lift arm 368 is coupled to the connecting rod 314 through the pivotal connection 315. In this way, the connecting rod 314 can pivot about the lift arm 368 while moving with the pinion 324. In operation, the lift assembly 360 operates the same as the lift assembly 300, besides the lift arms 368 does not follow along a rail. Instead, the lift arms 368 pivot about the pin 364 allowing the fork end 370 of the lift arms 368 to raise and lower.

While the embodiment shown in FIG. 14 only shows a single side of the lift assembly 360, the lift assembly 360 includes another side including the same components of the side shown (the lift arm 368, the pinion 324, the rack 326, etc.). In another embodiment, the fork assembly 330 includes two forks 336 (e.g., one on each side), but the lift assembly 360 only includes a single lift arm 368, connecting rod 314, lift arm 320, rack 326, pinion 324, and electric motor 329. In this way, the components of the lift assembly facilitate the raising and lowering of the two forks 336. In one embodiment, the lift assembly 360 further includes an electric actuator 372 that further positions the lift arm 368.

Figure 15:
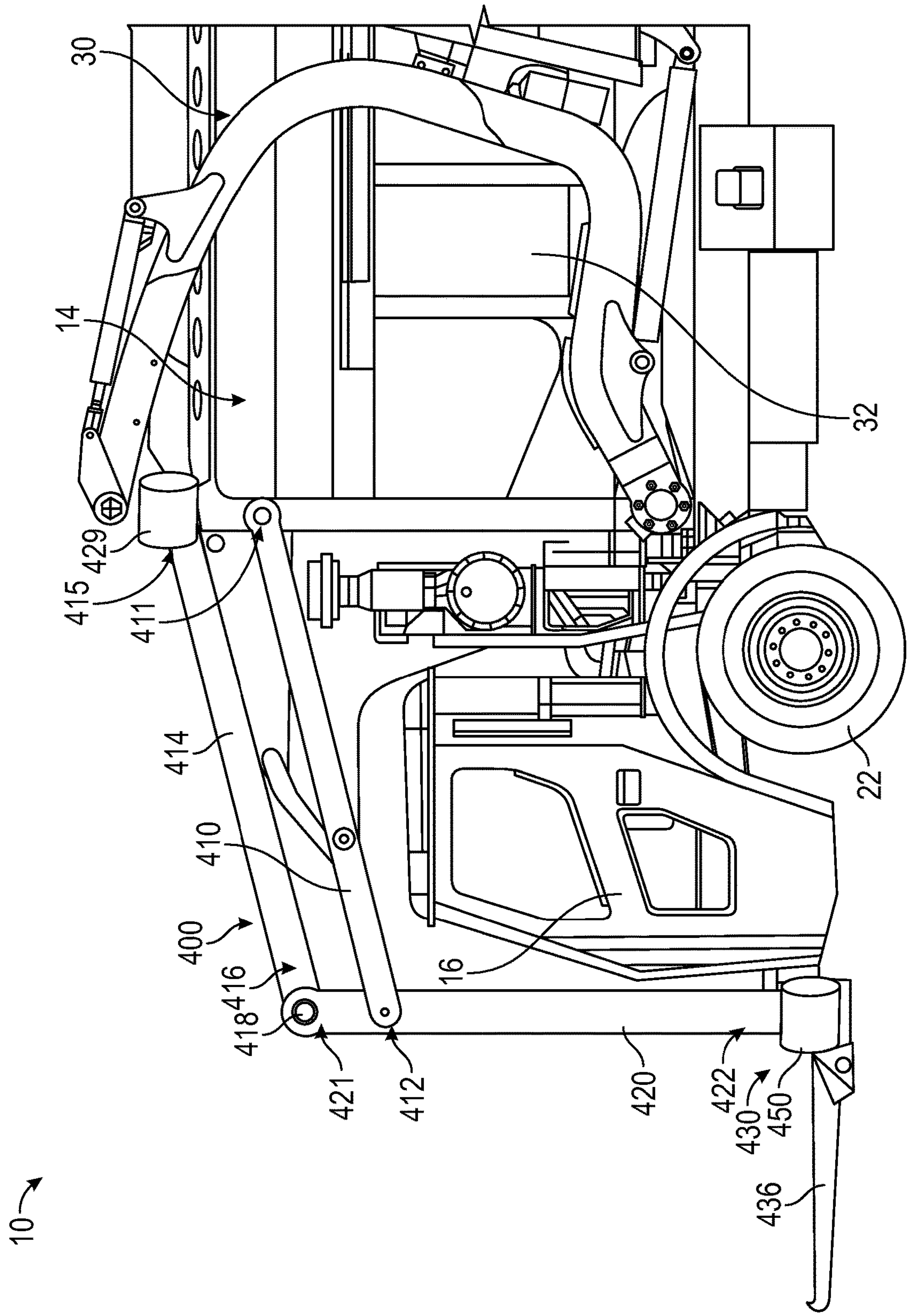
FIG. 15 is a side perspective view of a fourth lift assembly of the vehicle of FIG. 1, according to another exemplary embodiment.
Figure 16:
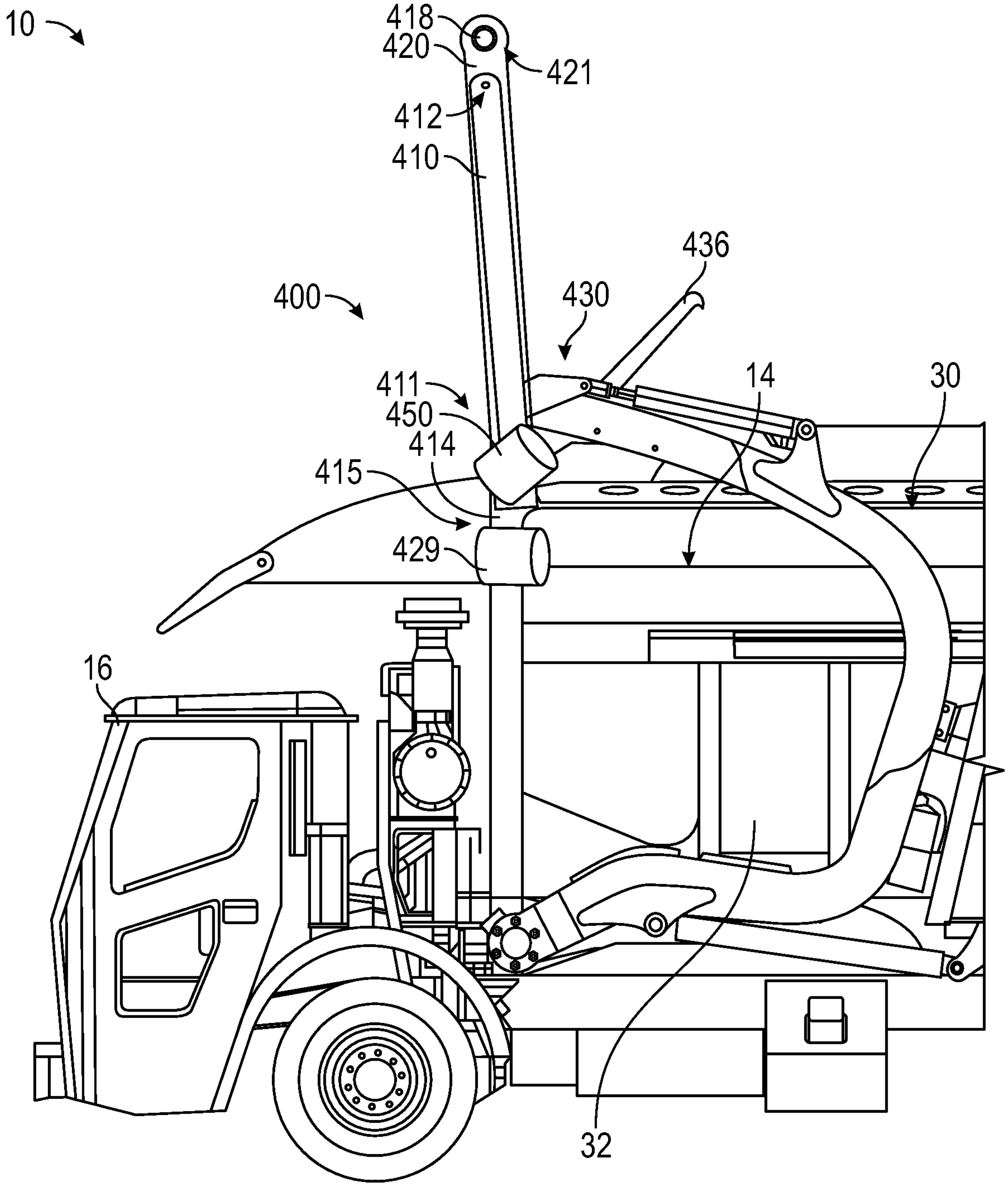
FIG. 16 is a side view of the fourth lift assembly of FIG. 15.

Referring now to FIGS. 15-16, a lift assembly 400 is shown. The lift assembly 400 is implemented in place of any of the previous lift assemblies while providing a similar function (e.g., the raising and lowering of a fork assembly 430). The lift assembly 400 may include one or more bars (linkages) 410 and 414 (e.g., a first bar 410 and a second bar 414). The first bar 410 is generally parallel to the second bar 414 and includes a first end 411 and a second end 412. The first end 411 is pivotally coupled to the body 14 to allow the first bar 410 and first end 411 to pivot about the body 14. The second end 412 is pivotally coupled to a lift arm (bar or linkage) 420 to allow the lift arm 420 to pivot about the second end 412. The second bar 414 includes a third end 415 and a fourth end 416. The third end 415 is coupled to a lift arm actuator 429 to be rotated about the third end 415. The fourth end 416 is pivotally coupled to the lift arm 420 through a pivotal connection 418 so that the lift arm 420 may pivot about the fourth end 416. The lift arm 420 includes both a pivot end 421 and a fork end 422. The pivot end 421 is the end at which the lift arm 420 is pivotally coupled to the fourth end 416 of the second bar 414 through the pivotal connection. The two bars 410, 414, the body 14, and the lift arm 420 may form a four-bar linkage. A four-bar linkage is a simple linkage that has a single degree of freedom allowing the system (e.g., the location of all four bars) to be easily defined. By using a four-bar linkage, the number of required components of the system is reduced allowing the lift assembly 400 to be relatively light.

The lift assembly 400 further includes one or more fork assemblies 430. The fork assembly 430 is similar to the fork assembly 330 and thus similar reference numerals are used. One noticeable between the fork assembly 430 and the fork assembly 330 is that the fork actuator 450 is not required to keep the forks 436 level as they raise or lower. Instead, the four-bar linkage (e.g., the two bars 410, 414, the body 14, and the lift arm 420) lifts the forks 436 in such a way that the forks 436 stay level as they rise. The fork actuator 450 is still required to rotate the forks 436 at the highest point to empty the refuse container 60.

The lift assembly 400 further includes the one or more lift arm actuators 429. The lift arm actuator 429 is coupled to the second bar 414 and the body 14 to rotate the second bar about the third end 415. The lift arm actuator 429 will be described further herein, but may be any kind of actuator that provides the rotational force required to rotate the third end 415, including actuators previously disclosed. In operation, the lift arm actuator 429 provides a force to the second bar 414 that causes it to rotate about the third end 415. As the second bar is pivotally coupled to the lift arm 420, this further causes the lift arm 420 and the fork assembly 430 coupled thereto to raise or lower between a lowered position (FIG. 15) and a raised position (FIG. 16). The first bar 410 also raises or lowers with the lift arm 420. Once in the raised position, the fork actuator 450 rotates the forks 436 and causes the refuse container to empty. While the embodiment shown in FIGS. 15-16 only shows a single side of the lift assembly 400, the lift assembly 400 includes another side including the same components of the side shown (e.g., the fork assembly 430, the lift arm 420, the lift arm actuator 429, etc.).

Figure 17:
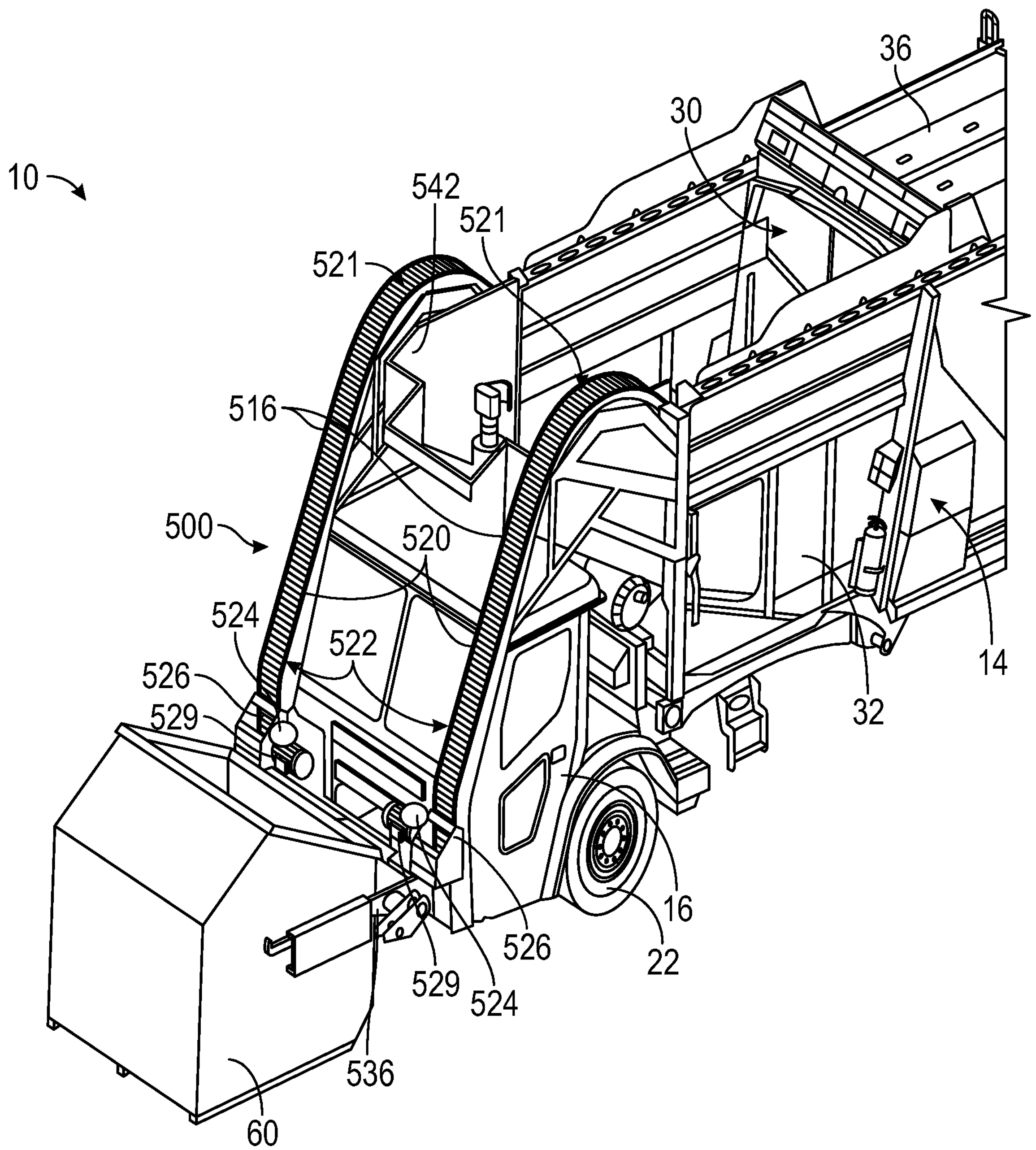
FIG. 17 is a perspective view of a fifth lift assembly of the vehicle of FIG. 1, according to another exemplary embodiment.
Figure 18:
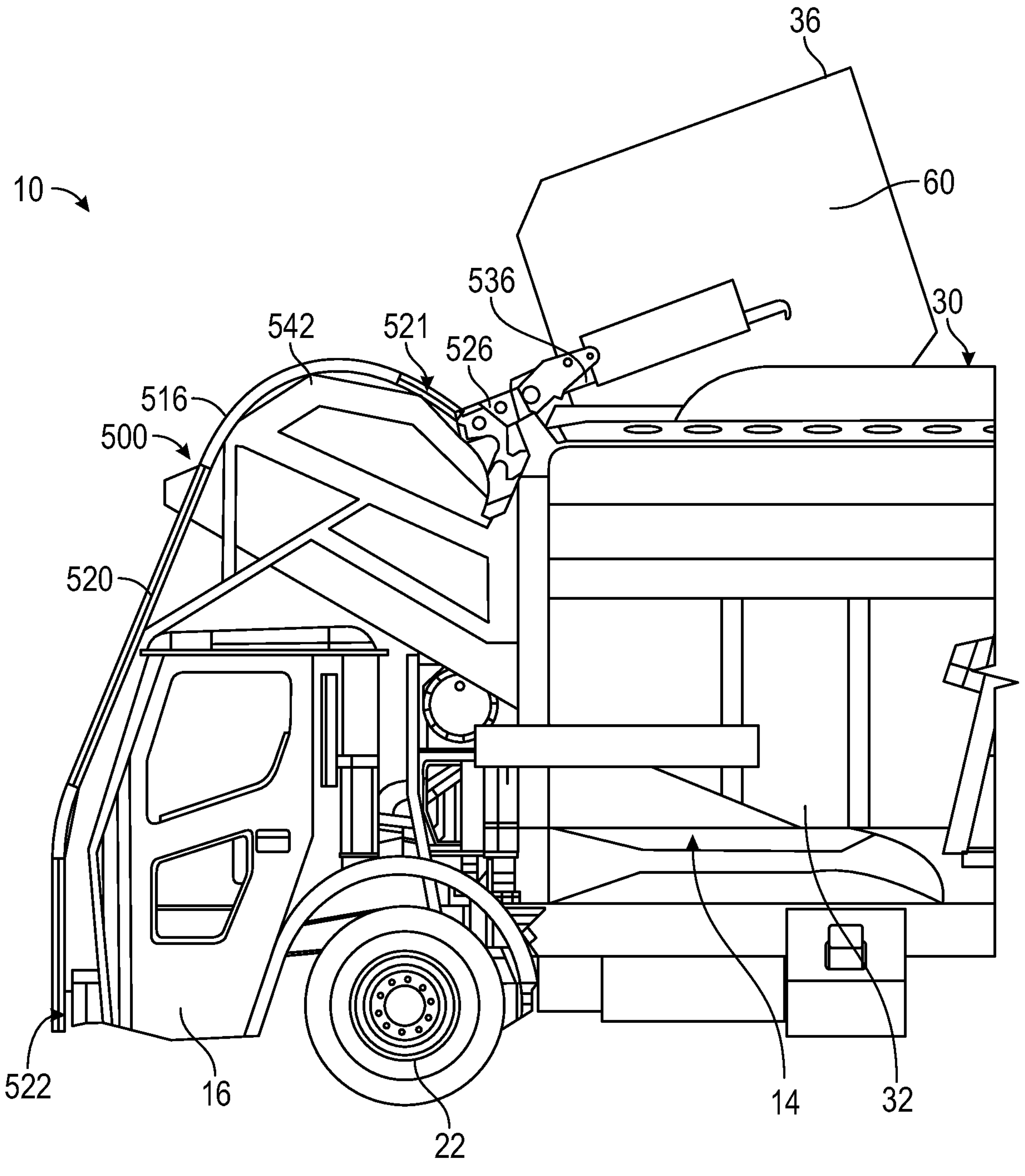
FIG. 18 is a side view of the fifth lift assembly of FIG. 17.

Referring now to FIGS. 17-18, a lift assembly 500 is shown. The lift assembly 500 is implemented in place of any of the previous lift assemblies while providing a similar function (e.g., the raising and lowering of a fork assembly 530). The lift assembly 500 may include one or more rails 520, one or more drive gears 524, and one or more electric motors 529. The rails 520 extend relatively vertically between a first end 521 and a second end 522. Additionally, each rail 520 includes multiple prongs 516 that extend across each rail 520. The lift assembly 500 may further include one or more rail lifts 526. Each rail lift 526 is movably coupled to a respective rail 520 and configured to travel between the first end 521 and the second end 522. The rails 520 are each further coupled to the drive gear 524. The drive gear 524 catches on the prongs 516 moving the rail lift 526 along the respective rail 520. The rail lifts 526 are movably coupled to the respective rail 520. The drive gear 524 is rotatably coupled to an electric motor 529 to receive an output torque. The electric motor 529 is electrically coupled to and receives power from the energy storage and/or generation system 20. The electric motor 529 then converts the electric power into mechanical torque. The torque is provided to the drive gear 524 through an output shaft of the electric motor 529. The drive gear 524 then provides this torque to the prongs 516 moving the respective rail lift 526 along the rail.

The lift assembly 500 further includes one or more forks 536. The forks 536 are similar to the previous forks described, but are not coupled to a fork actuator. Because of the layout of each rail 520, a fork actuator is not required to keep the forks 536 level or actuate the forks 536 to empty the refuse container 60. As shown in FIG. 18, the rail 520 includes a curve along the first end 521 that facilitates moving the refuse container 60 upside down and/or emptying the refuse container 60. Additionally, the rail 520 provides a slight angle between the first end 521 and the second end 522 that does not allow the refuse container 60 to separate from the forks 536. In this way, the lift assembly 500 contains less drive components than is normal requiring no actuator (electric or otherwise) to rotate the forks 536 during operation. In some embodiments, the forks 536 are rotatably coupled to the respective rail lift 526. In this way, an operator of the refuse vehicle 10 can manually adjust the forks when they are near the second end 522 to better receive the refuse container 60.

The refuse vehicle 10 further includes a modified hopper opening 542 to replace the hopper opening 42. As shown, the modified hopper opening 542 further extends upward towards the cab 16 to create a catch. As the forks 536 are not rotated by a fork actuator, the forks 536 do not extend into the hopper 30 as far as in previous lift assemblies. In this way, the modified hopper opening 542 is included to catch any falling refuse from the refuse container 60 and provide support for the rails 520. In some embodiments, the modified hopper opening 542 is angled toward the hopper 30 to allow refuse to slide back into the hopper 30.

In operation, the forks 536 receive the refuse container 60 while near the second end 522 (FIG. 17). The electric motors 529 are then selectively operated (e.g., receive power from energy storage and/or generation system 20) by the operator of the refuse vehicle 10. In one embodiment, the electric motors 529 must work in tandem (e.g., synchronization) moving in the same direction, at the same speed, and at the same time. The electric motors 529 then drive the respective drive gear 524. The drive gear 524 then moves the rail lift 526 along the respective rail 520 towards the first end 521. As the electric motors 529 operate in synchronization, the rail lifts 526 move in synchronization moving both forks 536 along the rails 520 together. In this way, the refuse container 60 that is received by the forks 536 moves along the rails 520 as well. Once at the first end 521 (FIG. 18), the refuse container 60 is nearly upside down and all of the refuse within is emptied into the hopper 30. At this point, the electric motors 529 operate in the opposite direction, powering the drive gears 524 in the opposite direction, and lowering the rail lifts 526. In some embodiments, the electric motors 529 include a limit switch that prevents them from operating past the ends (e.g., 521 or 522) of the rail 520.

Figure 19:
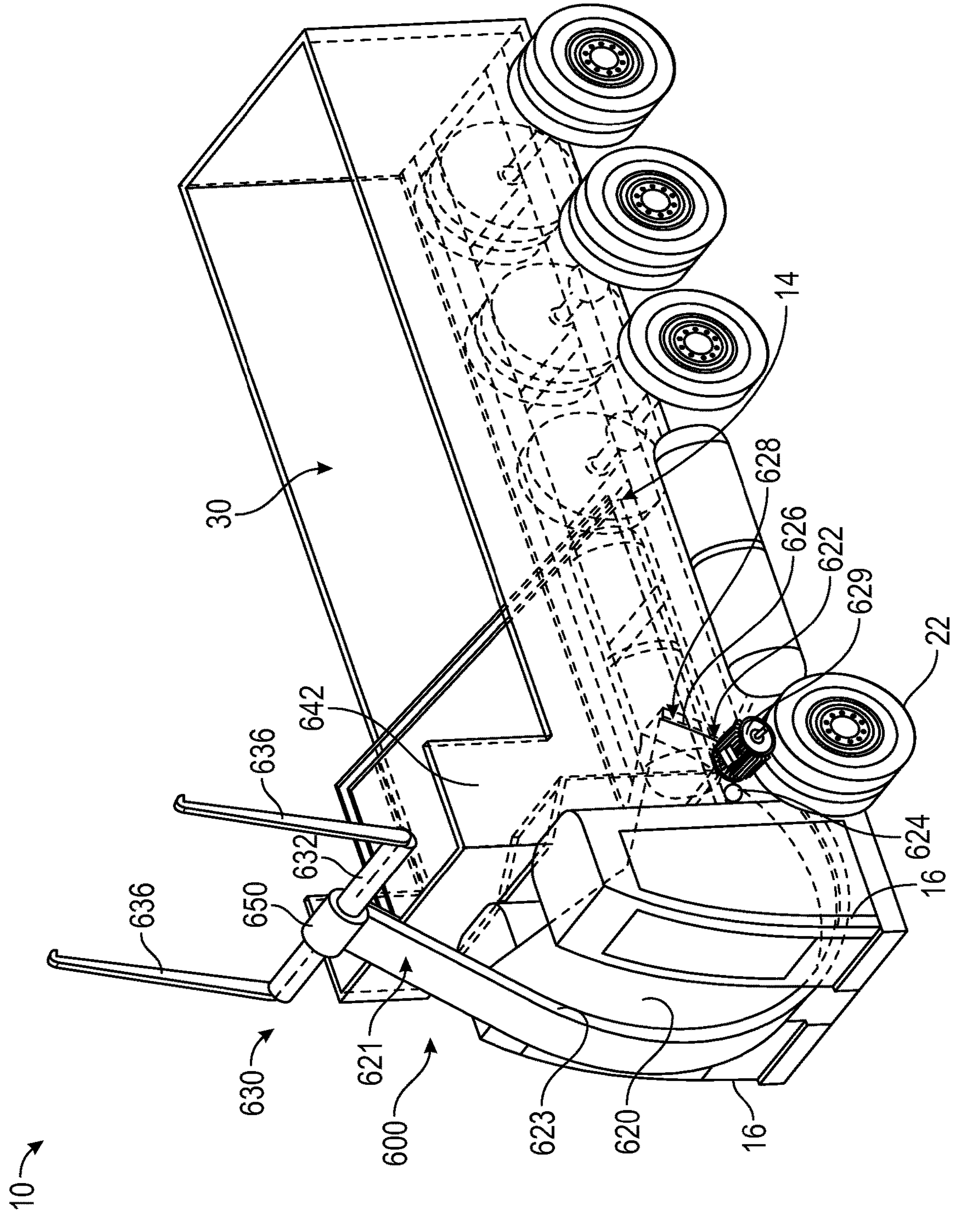
FIG. 19 is a perspective view of a sixth lift assembly of the vehicle of FIG. 1, according to another exemplary embodiment.
Figure 20:
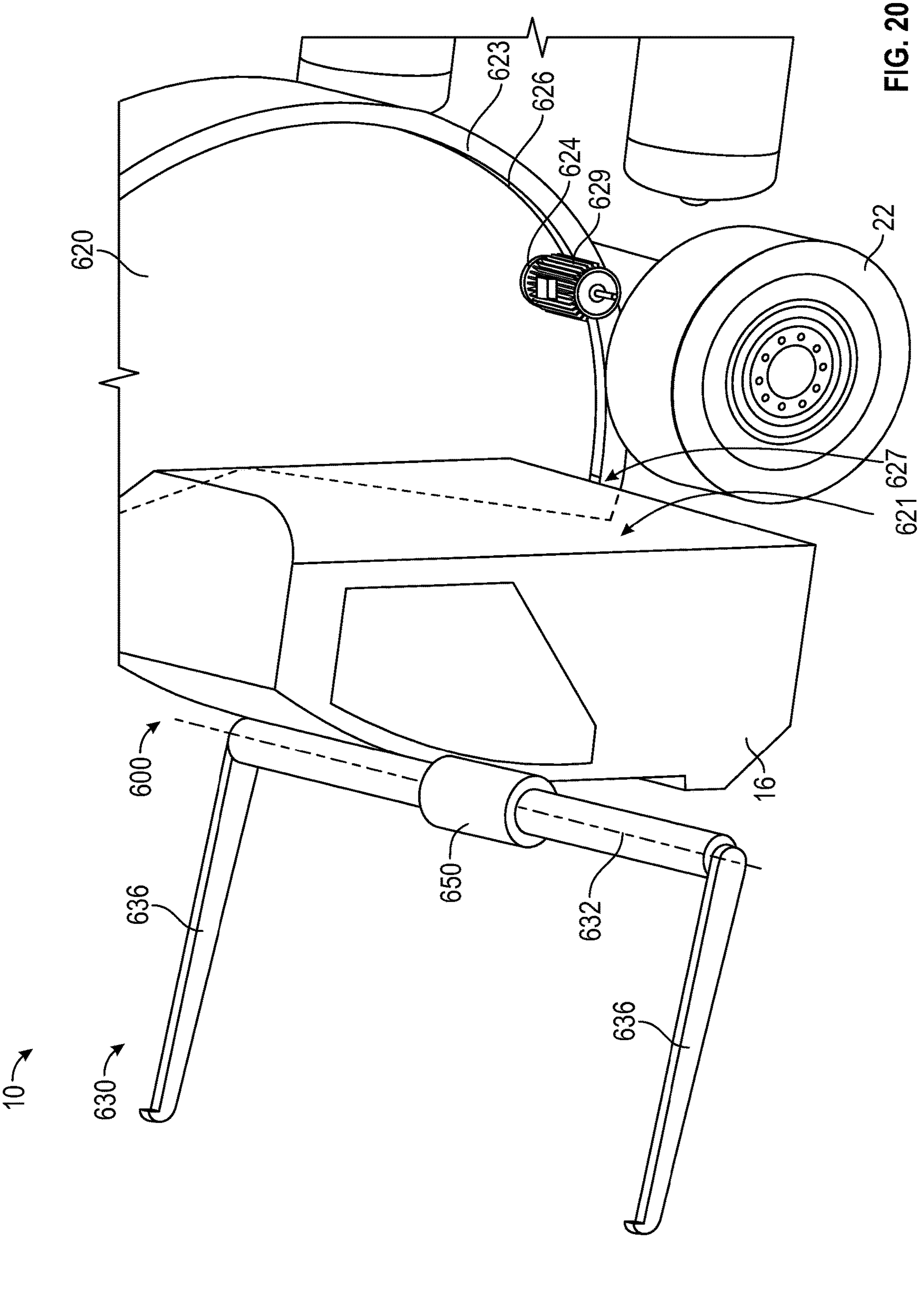
FIG. 20 is a side perspective view of the sixth lift assembly of FIG. 19.

Referring now to FIGS. 19-20, a lift assembly 600 is shown. The lift assembly 600 is implemented in place of any of the previous lift assemblies while providing a similar function (e.g., the raising and lowering of a fork assembly 630). The lift assembly 600 may include a lift portion (e.g., lift arm) 620. The lift portion 620 is shown to be a semi-circular portion that is includes a first end 621 and a second end 622. In another embodiment, the lift portion 620 is other shapes including a full circle, an ellipse, etc. As shown in FIGS. 19-20, the refuse vehicle 10 further includes a second cab 16 separate from the first cab 16. This type of layout is referred to as a split cab and allows a space between the first cab 16 and the second cab 16. Within this space, the lift portion 620 is located, providing a central location for the lift portion 620. This allows the lift assembly 600 to include a single lift portion 620 and not two or more lift portions 620 (similar to the lift arms 220). In some embodiments, there may be two or more lift portions 620. The lift portion 620 further includes a lip 623 that extends outward from the lift portion 620 where a rack 626 is located. The rack 626 is coupled to the lip 623 of the lift portion 620 and includes a third end 627 and a fourth end 628. The rack 626 is movably coupled to a pinion 624 along which the rack 626 moves. The pinion 624 is coupled to the rack 626 through one or more gear teeth. Both the pinion 624 and the rack 626 have the same diametral pitch and are include multiple gear teeth in contact. In this way, the teeth of the rack 626 and the pinion 624 mesh.

The pinion 624 is further coupled to an electric motor 629. The electric motor 629 is electrically coupled to and receives power from the energy storage and/or generation system 20.

The electric motor 629 then converts the electric power into mechanical torque. The torque is provided to the pinion 624 through an output shaft of the electric motor 629. As the pinion 624 rotates about the output shaft of the electric motor 629, the pinion moves the rack 626 as well the lift portion 620 coupled thereto rotating the lift portion 620 about a center of the semi-circle. This rotation raises and lowers the first end 621 of the lift portion 620 as well as a fork assembly 630 coupled thereto. While only a single electric motor 629, pinion 624, and rack 626 are shown, the lift assembly 600 may include more than one. For example, in one embodiment, the lift assembly 600 includes a first and second electric motor 629, a first and second pinion 624, and a first and second rack 626 located on a first and second lip 623, respectively. The first and second electric motors 629 operating in tandem.

The lift assembly 600 further includes the fork assembly 630. The fork assembly 630 is coupled to the lift portion 620 at the first end 621 and includes two or more forks 636, a fork shaft 632 connecting the two forks 636, and one or more fork actuators 650. In some embodiments, there is fork actuator 650 for each fork 636. In other embodiments, a single fork actuator 650 operates two or more forks 636. Each fork actuator 650 is configured to rotate the respective fork 636 about the fork shaft 632 and will be described further herein. Additionally, the refuse vehicle 10 further includes a modified hopper opening 642 to replace the hopper opening 42. As shown, the modified hopper opening 642 further extends upward towards the cabs 16 to create a catch. As the first end 621 does not reach as far back as in some other embodiments, the modified hopper opening 642 extends farther out. This allows the hopper 30 to catch any refuse that may be otherwise missed.

In operation, the forks 636 receive the refuse container 60 while relatively lower (FIG. 20). The electric motor 629 is then selectively operated (e.g., receive power from energy torage and/or generation system 20) by the operator of the refuse vehicle 10. The electric motors 629 then drives the pinion 624 along the rack 626 moving it towards a fourth end 628. As the pinion 624 nears the fourth end 628, the first end 621 of the lift portion 620 raises up and nears the modified hopper opening 642. Once the first end 621 is at the highest/nearest point (FIG. 19), the fork actuator 650 actuates the forks 636 and empties the refuse container 60. At this point, the electric motor 629 operates in the opposite direction, powering the pinion 624 in the opposite direction, and lowering the first end 621. While the electric motor 629 is raising and lowering the first end 621, the fork actuator 650 must keep the forks 636 and the refuse container 60 received therein level. As the forks 636 are lifting the refuse container 60 it is important that the fork 636 stay level or the refuse container 60 may fall or lose debris.

Figure 21:
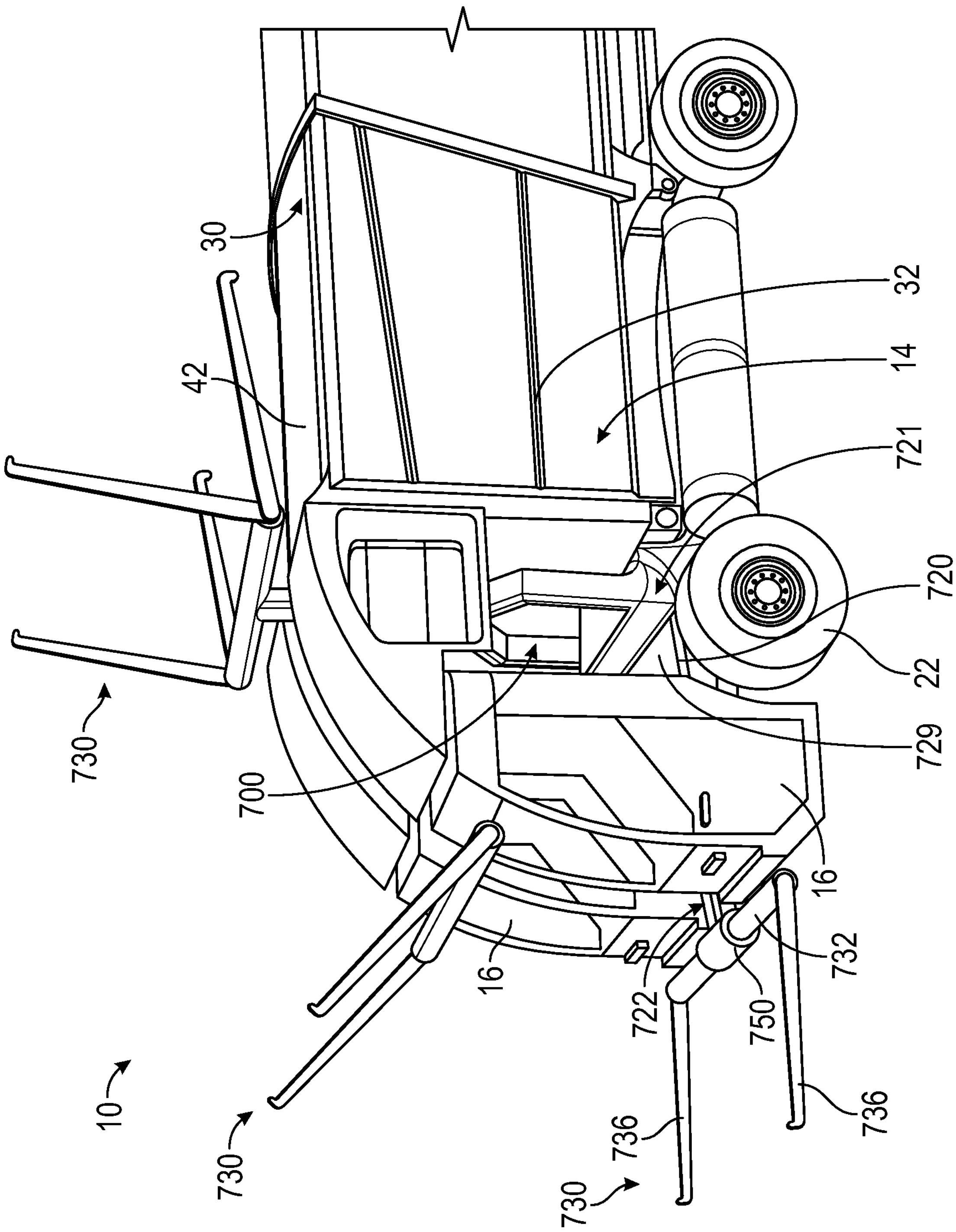
FIG. 21 is a perspective view of a seventh lift assembly of the vehicle of FIG. 1, according to another exemplary embodiment.
Figure 22:
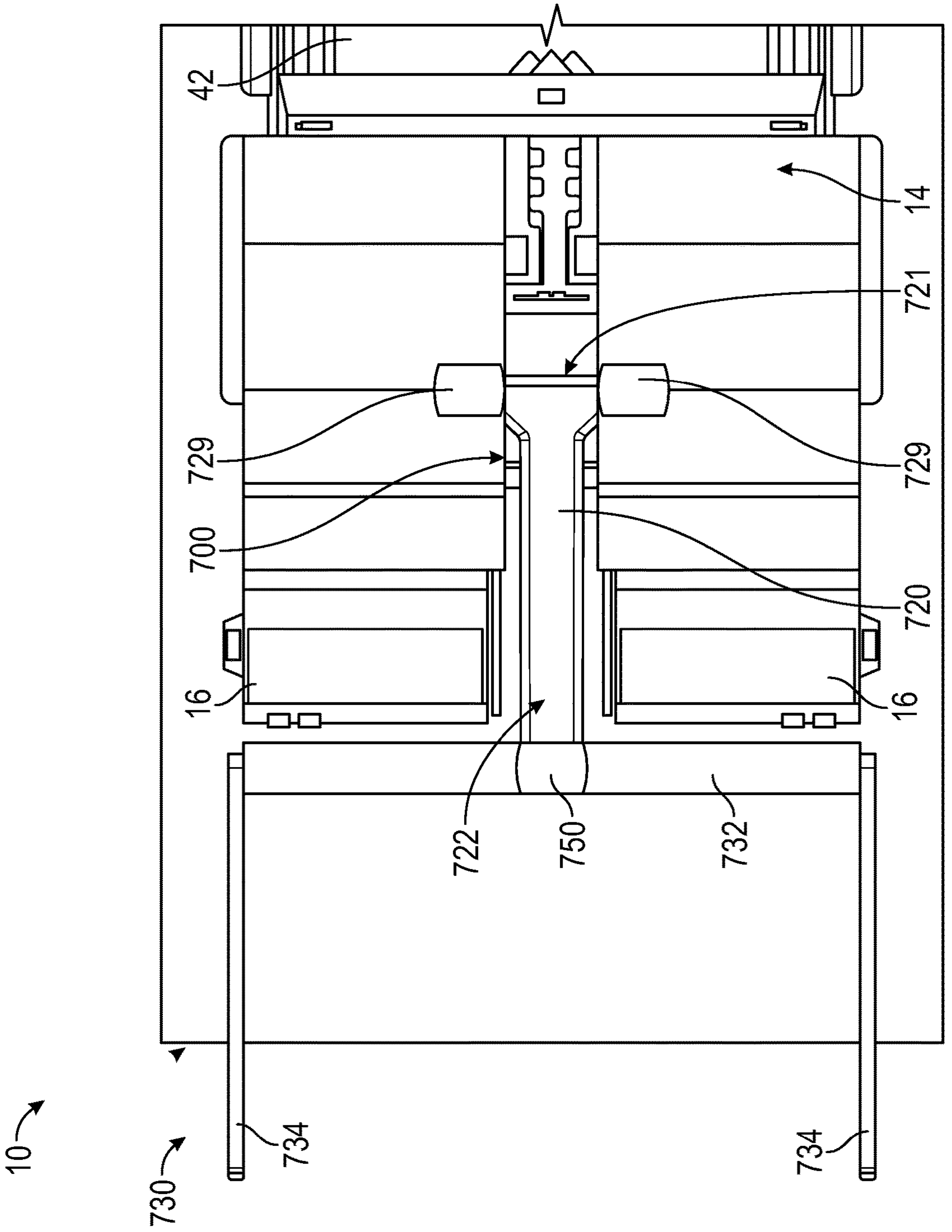
FIG. 22 is a top view of the seventh lift assembly of FIG. 21.

Referring now to FIGS. 21-22, a lift assembly 700 is shown. The lift assembly 700 is implemented in place of any of the previous lift assemblies while providing a similar function (e.g., the raising and lowering of a fork assembly 730). The lift assembly 700 may include a lift arm 720 and one or more lift arm actuators 729. The lift arm 720 is a bar that includes a fork end 722 and an actuator end 721. As shown in FIGS. 21-22, the refuse vehicle 10 further includes a second cab 16 separate from the first cab 16. This type of layout is referred to as a split cab and allows a space between the first cab 16 and the second cab 16. Within this space, the lift arm 720 located, providing a central location for the lift arm 720. This allows the lift assembly 700 to include a single lift arm 720 and not two or more lift arms 720 (similar to the lift arms 220). In some embodiments, there may be two or more lift arms 720. The lift arm 720 is coupled at the actuator end 721 to one or more lift arm actuators 729. In one embodiment, there is a central lift arm actuator 729 (FIG. 21) that is configured to rotate the lift arm 720 about the actuator end 721. In another embodiment, there are two opposed lift arm actuators 729 (FIG. 22) that are configured to both operate in tandem and rotate the lift arm 720 about the actuator end 721. The lift arm actuator 729 may be any kind of actuator that is configured to rotate the lift arm 720 about the actuator end 721 including an electric motor directly coupled to the lift arm 720 or an electric motor including a gear assembly coupled to the lift arm 720.

The lift assembly 700 further includes the fork assembly 730. The fork assembly 730 is coupled to the lift arm 720 at the fork end 722 and includes two or more forks 736, a fork shaft 732 connecting the two forks 736, and one or more fork actuators 750. In some embodiments, there is fork actuator 750 for each fork 736. In other embodiments, a single fork actuator 750 operates two or more forks 736. Each fork actuator 750 is configured to rotate the respective fork 736 about the fork shaft 732 and will be described further herein. In even other embodiments, the fork assembly 730 does not include a fork actuator 750 and instead the forks 736 are rotatable in a single direction towards the rear of the refuse vehicle 10. In this way, when the refuse container 60 and the fork assembly 730 reaches the point where the refuse container is to be emptied, the forks 736 rotate about the fork shaft 732 due to gravity. Then when the forks 736 are lowered, the forks 736 may manually be pulled back. In another embodiment, the fork shaft 732 includes a torsion spring that provides a torque to the fork shaft 732 to bring the forks 736 back to their normal position (FIG. 22). Additionally, the distance between the two forks 736 (e.g., the length of the fork shaft 732) is adjustable. In one embodiment, the fork shaft 732 is a telescoping shaft that is adjustable. In this way, the fork assembly 730 is usable on variously different sized refuse containers. Operation of the lift assembly 700 is substantially the same as the lift assembly 600. The main difference being that the lift assembly 700 is raised and lowered by the lift arm actuator 729 and not a rack and pinion system. FIG. 21 shows the lift assembly 700 as it moves from the lowest position to the highest position.

Figure 23:
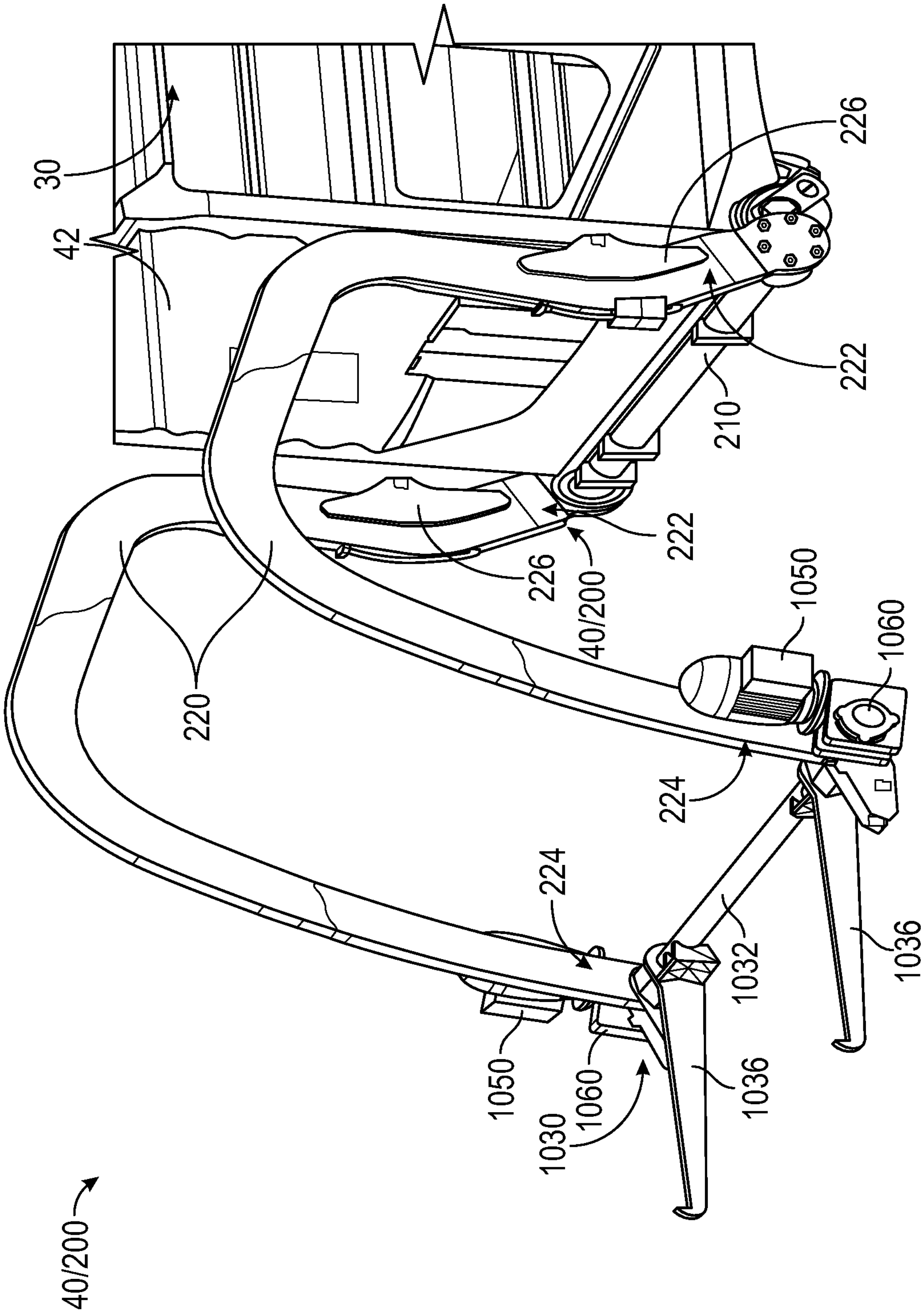
FIG. 23 is a perspective view of the of the lift assembly of FIG. 4, with a third fork actuator, according to another exemplary embodiment.

Referring now to FIG. 23, the fork assembly 1030 is shown, according to an exemplary embodiment. The fork assembly 1030 is shown in conjunction with the lift assembly 200, but may be combined with any other lift assembly described herein. The fork assembly 1030 is shown to include two forks 1036, a fork shaft 1032 coupled to both forks 1036, two electric motors 1050, and two gear assemblies 1060. Each electric motor 1050 is electrically coupled to and receives power from the energy storage and/or generation system 20. The electric motor 1050 then converts the electric power into mechanical torque. The torque is provided to the respective gear assembly 1060 through an output shaft of the electric motor 1050. The gear assemblies 1060 may be substantially the same as the gear assembly 266, but instead of facilitating rotation of the pin 210 facilitate rotation of the fork shaft 1032. The gear assembly 1060 may include multiple gears that are sized to provide enough torque to lift the fork shaft 1032. To facilitate powering the electric motors 1050, the lift arms 220 may include wires that electrically couple the electric motors 1050 to the energy storage and/or generation system 20. Additionally, the electric motors 1050 may be in synch/operate in tandem to rotate the fork shaft 1032 as well as the forks 1036 at the same time and in the same direction.

Figure 24:
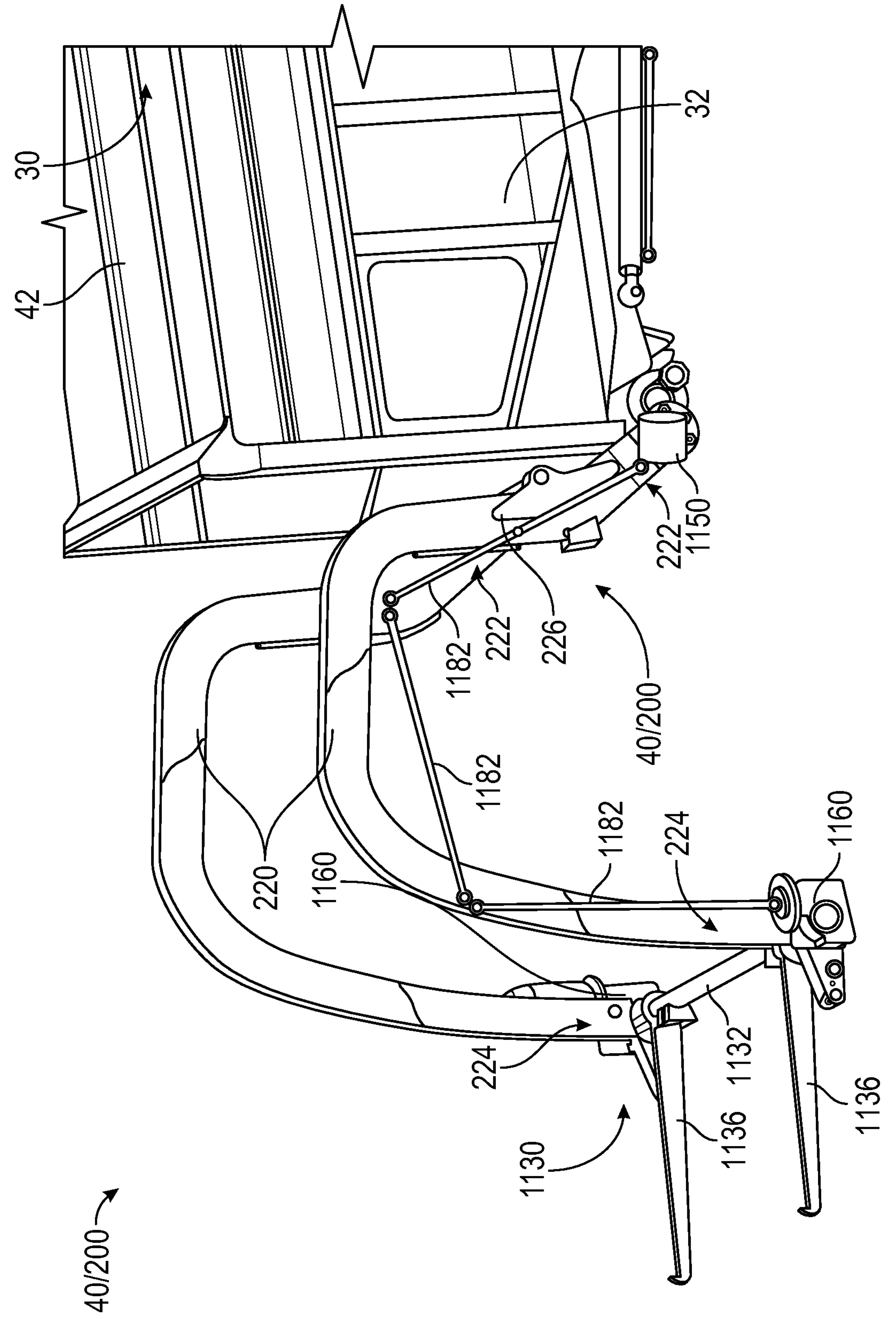
FIG. 24 is a perspective view of the of the lift assembly of FIG. 4, with a fourth fork actuator, according to another exemplary embodiment.

Referring now to FIG. 24, the fork assembly 1130 is shown, according to an exemplary embodiment. The fork assembly 1030 is shown in conjunction with the lift assembly 200, but may be combined with any other lift assembly described herein. The fork assembly 1130 is shown to include two forks 1136, a fork shaft 1132 coupled to both forks 1136, multiple drive shafts 1182, and two gear assemblies 1160. The fork assembly 1130 is further shown to work in tandem with the electric motor 1150. The electric motor 1150 is used to rotate the lift arms 220 about the pin 210, but also is coupled to the drive shafts 1182. In another embodiment, the fork assembly 1130 includes one or more dedicated electric motors 1150 that are simply coupled to the body 14 to support the weight of the electric motors 1150. The electric motor 1150 is electrically coupled to and receives power from the energy storage and/or generation system 20. The electric motor 1150 then converts the electric power into mechanical torque. The torque is provided to at least one of the drive shafts 1182 through an output shaft of the electric motor 1150. The drive shafts 1182 transmit the torque form the electric motor 1150 to the gear assembly 1160. In this way, the lift arms 220 do not include the weight of the electric motor 1150 (which can be relatively heavy). This extra weight (as shown on FIG. 29) can be counterproductive as the lift arms 220 must also rotate about the pins 210, and the added weight requires even more torque to do so. By using the drive shafts 1182, the weight of the electric motor 1150 is supported by the refuse vehicle 10.

The gear assemblies 1160 may be substantially the same as the gear assembly 266, but instead of facilitating rotation of the pin 210 facilitate rotation of the fork shaft 1132. The gear assembly 1160 may include multiple gears that are sized to provide enough torque to lift the fork shaft 1132 and the forks 1136. In operation, the electric motor 1150 powers the drive shafts 1182 which power the gear assembly 1160. The gear assembly 1160 then powers the fork shaft 1132 causing rotation of the forks 1136.

Figure 25:
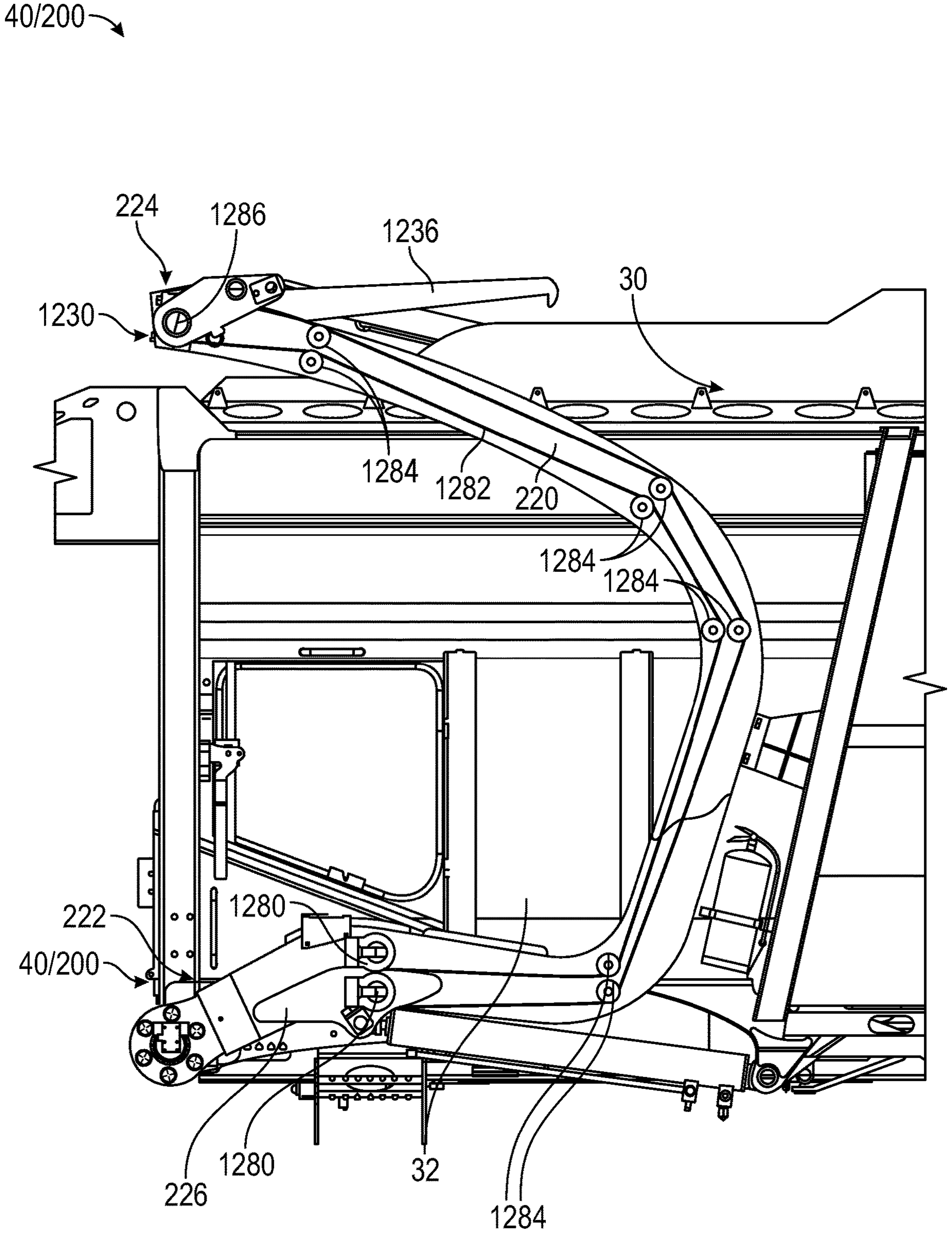
FIG. 25 is a perspective view of the of the lift assembly of FIG. 4, with a fifth fork actuator, according to another exemplary embodiment.

Referring now to FIG. 25, the fork assembly 1230 is shown, according to an exemplary embodiment. The fork assembly 1230 is shown in conjunction with the lift assembly 200, but may be combined with any other lift assembly described herein. The fork assembly 1230 includes two forks 1236, a fork shaft 1286 coupled to both forks 1236, one or more electric motors 1280, one or more cables 1282 coupled to the respective electric motor 1280, and multiple transfer pulleys 1284. Each electric motor 1280 is electrically coupled to and receives power from the energy storage and/or generation system 20. The electric motor 1280 then converts the electric power into mechanical torque. The torque is provided to the fork shaft 1286 to rotate the forks 1236 through the cable 1282 and the transfer pulleys 1284. As shown, the cable 1282 extends along the entire lift arm 220 through the one or transfer pulleys 1284.

The transfer pulleys are coupled to the respective lift arm 220 and provide a direction for the cable 1282. As shown the fork assembly 1230 may include two electric motors 1280 for each lift arm 220. In one embodiment, one electric motor 1280 facilitates pulling the cable 1282 in and another facilitates pushing the cable 1282. In another embodiment, the electric motors 1280 do not operate at the same time, but rather only the electric motor 1280 that can pull the cable 1282 is operating. The electric motors 1280 include a drive pulley (not shown) to which the cable 1282 is attached and tensioned. The motors 1280 then provide a torque to the move the cable 1282. The cable 1282 is then wrapped about an end of the fork shaft 1286 or a pulley coupled to the fork shaft 1286 to provide a torque to for the shaft 1286.

It should be understood that the previously described lift assemblies and fork assemblies can be combined with one another. For example, the refuse vehicle 10 could include the lift assembly 300 and the fork assembly 730. In another example, the refuse vehicle 10 could include the lift assembly 600 and the fork assembly 230. While minor modifications may be required, the combination is not limited between any fork assemblies or any lift assemblies.

Additionally as referred to herein any "actuator(s)" may refer to any component that is capable of performing the desired function. For any "fork actuators" the desired function may refer to pivot the forks relative the lift arms or lift portion, and for any "lift actuators" the desired function may refer to pivot the lift arms or lift portion relative to the body assembly. For example, the lift arm actuator 429 may refer to electric actuators configured to be powered via electricity provided by the energy storage and/or generation system 20, ball screw actuators (e.g., ball screws driven by an electric motor), linear actuators, hydraulic cylinders driven by an electronically driven hydraulic pump (e.g., driven by the electric motor 18, the secondary electric motor, etc.), a rack and a pinion driven by an electric motor, a winch system that is configured to cause rotation, a torsion spring that causes actuation, or various other actuators. In another example, the actuators are an electric pump that pressurize a hydraulic fluid and then drive, lift, or rotate the various components through hydraulic cylinders filled with the pressurized hydraulic fluid. In yet another example, the actuators are electric high force ball screw actuators that provide enough force to drive, lift, or rotate the various components. The same is true for the various fork actuators and other "actuators" disclosed herein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle comprising:
- a chassis;
- a body assembly coupled to the chassis, the body assembly defining a refuse compartment; and
- a lift assembly including:
  - a first lift arm;
  - a second lift arm;
  - a pair of forks; and
  - a lift arm actuator assembly including:
    - a first electric lift actuator positioned proximate the first lift arm;
    - a second electric lift actuator positioned proximate the second lift arm, wherein the first electric lift actuator and the second electric lift actuator are configured to pivot the first lift arm and the second lift arm; and
    - one or more electric fork actuators configured to pivot the pair of forks relative to the first lift arm and the second lift arm.

2. The refuse vehicle of claim 1, wherein each of the first electric lift actuator and the second electric lift actuator includes an electric lift motor.

3. The refuse vehicle of claim 2, wherein each of the first electric lift actuator and the second electric lift actuator includes a gear assembly or a pulley assembly.

4. The refuse vehicle of claim 3, wherein each of the first electric lift actuator and the second electric lift actuator includes the gear assembly.

5. The refuse vehicle of claim 4, wherein the gear assembly has variable gearing.

6. The refuse vehicle of claim 3, wherein each of the first electric lift actuator and the second electric lift actuator includes the pulley assembly.

7. The refuse vehicle of claim 1, further comprising a pin having a first end coupled to the first lift arm and an opposing second end coupled to the second lift arm, wherein the first electric lift actuator is positioned at or proximate the first end of the pin, and wherein the second electric lift actuator is positioned at or proximate the opposing second end of the pin.

8. The refuse vehicle of claim 7, wherein each of the first electric lift actuator and the second electric lift actuator includes (a) an electric lift motor and (b) a gear assembly or a pulley assembly coupling the electric lift motor to the pin.

9. The refuse vehicle of claim 1, wherein the first electric lift actuator includes at least one of (a) an electric lift motor or (b) an electric pump and a hydraulic actuator.

10. The refuse vehicle of claim 1, further comprising a fork shaft extending between the first lift arm and the second lift arm, wherein the pair of forks are coupled to the fork shaft, and wherein the one or more electric fork actuators are coupled to the fork shaft and configured to rotate the fork shaft to pivot the pair of forks relative to the first lift arm and the second lift arm.

11. The refuse vehicle of claim 10, wherein the one or more electric fork actuators include one or more electric fork motors, and wherein an output of the one or more electric fork motors is oriented perpendicular to the fork shaft.

12. The refuse vehicle of claim 1, wherein the one or more electric fork actuators include an electric fork motor and a gear assembly.

13. A refuse vehicle comprising:

a chassis;

a body assembly coupled to the chassis, the body assembly defining a refuse compartment; and a lift assembly including:

a first lift arm;

a second lift arm; and a lift arm actuator assembly configured to pivot the first lift arm and the second lift arm, the lift arm actuator assembly including:

an electric lift motor; and a gear assembly coupled to the electric lift motor.

14. The refuse vehicle of claim 13, further comprising a pin having a first end coupled to the first lift arm and an opposing second end coupled to the second lift arm, wherein the gear assembly is coupled to the pin.

15. The refuse vehicle of claim 13, wherein the electric lift motor is a first electric lift motor positioned proximate the first lift arm and the gear assembly is a first gear assembly, further comprising:

a second electric lift motor positioned proximate the second lift arm; and a second gear assembly coupled to the second electric lift motor.

16. The refuse vehicle of claim 13, further comprising:

a pair of forks; and one or more electric fork actuators configured to pivot the pair of forks relative to the first lift arm and the second lift arm.

17. The refuse vehicle of claim 16, further comprising a fork shaft extending between the first lift arm and the second lift arm, wherein the pair of forks are coupled to the fork shaft, and wherein the one or more electric fork actuators are coupled to the fork shaft.

18. The refuse vehicle of claim 17, wherein the one or more electric fork actuators include an electric fork motor and a fork gear assembly coupling the electric fork motor to the fork shaft, wherein an output of the electric fork motor is oriented perpendicular to the fork shaft.

19. A refuse vehicle comprising:

a chassis;

a body assembly coupled to the chassis, the body assembly defining a refuse compartment; and a lift assembly including:

a first lift arm;

a second lift arm;

a lift arm actuator assembly configured to pivot the first lift arm and the second lift arm;

a fork shaft extending between the first lift arm and the second lift arm;

a pair of forks coupled to the fork shaft; and an electric fork actuator configured to pivot the pair of forks relative to the first lift arm and the second lift arm;

wherein the electric fork actuator includes an electric fork motor and a gear assembly coupling the electric fork motor to the fork shaft; and wherein an output of the electric fork motor is oriented perpendicular to the fork shaft.

20. The refuse vehicle of claim 19, wherein the electric fork actuator is a first electric fork actuator positioned at or proximate a first end of the fork shaft, further comprising a second electric fork actuator positioned at or proximate an opposing second end of the fork shaft.

* * * * *